(12) United States Patent
Kras et al.

(10) Patent No.: US 11,599,838 B2
(45) Date of Patent: Mar. 7, 2023

(54) SYSTEMS AND METHODS FOR CREATING AND COMMISSIONING A SECURITY AWARENESS PROGRAM

(71) Applicant: KnowBe4, Inc., Clearwater, FL (US)

(72) Inventors: Greg Kras, Dunedin, FL (US); Alin Irimie, Clearwater, FL (US); Perry Carpenter, Austin, AR (US); Suzanne Gorman, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 74 days.

(21) Appl. No.: 16/013,486

(22) Filed: Jun. 20, 2018

(65) Prior Publication Data

US 2019/0005428 A1 Jan. 3, 2019

Related U.S. Application Data

(60) Provisional application No. 62/533,457, filed on Jul. 17, 2017, provisional application No. 62/522,455, filed on Jun. 20, 2017.

(51) Int. Cl.
*G06Q 10/06* (2023.01)
*H04L 9/40* (2022.01)
*G06Q 10/0631* (2023.01)

(52) U.S. Cl.
CPC ... *G06Q 10/06314* (2013.01); *H04L 63/1483* (2013.01)

(58) Field of Classification Search
CPC ............ G06Q 10/06314; H04L 63/1483
USPC ..................................................... 705/7.24
See application file for complete search history.

(56) References Cited

U.S. PATENT DOCUMENTS

| | | | |
|---|---|---|---|
| 7,599,992 | B2 | 10/2009 | Nakajima |
| 8,041,769 | B2 | 10/2011 | Shraim et al. |
| 8,464,346 | B2 | 6/2013 | Barai et al. |
| 8,484,741 | B1 | 7/2013 | Chapman |
| 8,615,807 | B1 | 12/2013 | Higbee et al. |
| 8,635,703 | B1 | 1/2014 | Belani et al. |
| 8,719,940 | B1 | 5/2014 | Higbee et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

OTHER PUBLICATIONS

"Human centric cyber security: What are the new trends in data protection?", Kassicieh, Aug. 1, 2015 (Year: 2015).*

(Continued)

*Primary Examiner* — Charles Guiliano
*Assistant Examiner* — Po Han Lee
(74) *Attorney, Agent, or Firm* — Foley & Lardner LLP

(57) ABSTRACT

Methods, systems and apparatus for implementing a security awareness program are provided which allow a device of a security awareness system to receive attributes of an implementation of a security awareness program from an entity, such as a company. Responsive to the attributes, the device determines a configuration for each of a baseline simulated phishing campaign, electronic based training of users of the entity for security awareness and one or more subsequent simulated phishing campaigns. The device initiates execution of the baseline simulated phishing campaign to identify a percentage of users of the entity that are phish-prone.

13 Claims, 36 Drawing Sheets

(56) References Cited

U.S. PATENT DOCUMENTS

| | | |
|---|---|---|
| 8,793,799 B2 | 7/2014 | Fritzson et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1* | 5/2017 | Belani .................. H04L 63/1433 |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,870,715 B2 | 1/2018 | Sadeh-Koniecpol et al. |
| 9,876,753 B1 | 1/2018 | Hawthorn |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 10,243,904 B1 | 3/2019 | Wescoe et al. |
| 10,298,608 B2* | 5/2019 | Knapp .................. H04L 63/1433 |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2007/0142030 A1 | 6/2007 | Sinha et al. |
| 2008/0318197 A1* | 12/2008 | Dion ........................ G09B 7/00 434/365 |
| 2010/0211641 A1 | 8/2010 | Yih et al. |
| 2010/0269175 A1 | 10/2010 | Stolfo et al. |
| 2012/0124671 A1 | 5/2012 | Fritzson et al. |
| 2012/0258437 A1 | 10/2012 | Sadeh-Koniecpol et al. |
| 2013/0198846 A1* | 8/2013 | Chapman ........... G06Q 10/0635 726/25 |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2014/0173726 A1 | 6/2014 | Varenhorst |
| 2014/0199663 A1* | 7/2014 | Sadeh-Koniecpol .... G09B 5/00 434/118 |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2015/0287336 A1* | 10/2015 | Scheeres .................. G09B 5/02 434/156 |
| 2016/0036829 A1 | 2/2016 | Sadeh-Koniecpol et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1* | 11/2016 | Hadnagy .................. H04L 51/22 |
| 2017/0026399 A1* | 1/2017 | Gatti .................. H04L 63/1433 |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0140663 A1 | 5/2017 | Sadeh-Koniecpol et al. |
| 2017/0237776 A1 | 8/2017 | Higbee et al. |
| 2017/0244746 A1* | 8/2017 | Hawthorn ........... H04L 63/1408 |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331848 A1 | 11/2017 | Alsaleh et al. |
| 2018/0041537 A1 | 2/2018 | Bloxham et al. |
| 2018/0096309 A1* | 4/2018 | Moses .................. H04W 12/02 |
| 2018/0103052 A1 | 4/2018 | Choudhury et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2020/0311260 A1 | 10/2020 | Klonowski et al. |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.

Palka et al., "Dynamic phishing content using generative grammars," Software Testing, Verification and Validation Workshops (ICSTW), 2015 IEEE Eighth International Conference, Date of Conference:Apr. 13-17, 2015,IEEE Xplore, pp. 1-8.

* cited by examiner

300

```
Receiving attributes of an implementation of a security
awareness program for an entity
310
            │
            ▼
Comparing the attributes for the entity to attributes of other
entities
312
            │
            ▼
Determining, responsive to the attributes, a configuration for a
baseline simulated phishing campaign
320
            │
            ▼
Determining, responsive to the attributes, a configuration for
electronic based training of users of the entity for security
awareness
330
            │
            ▼
Determining, responsive to the attributes, a configuration for
one or more subsequent simulated phishing campaigns
340
            │
            ▼
Determining, based on at least the comparison, the
configuration of at least one of the baseline simulated phishing
campaign, the electronic based training of users of the entity
for security awareness, or the one or more subsequent
simulated phishing campaigns
342
            │
            ▼
Initiating execution of the baseline simulated phishing
campaign to identify a percentage of users of the entity that
are phish-prone.
350
```

Receiving attributes for implementing a security awareness program for an entity
410

Generating the security awareness program comprising a plurality of actions, wherein at least one of the plurality of actions comprises a simulated phishing campaign and wherein at least another of the plurality of actions comprises an electronic training campaign
420

Automatically scheduling, to electronically represent a proposed schedule of the security awareness program, in an electronic calendar of a selected account, each of the plurality of actions as one of a meeting or a reminder based on a type of action
430

Generating, in the electronic calendar one or more graphical representations of the simulated phishing campaign and the electronic training campaign, wherein the one or more graphical representations are selectable to display one or more metrics of a corresponding campaign
440

```
Receiving attributes for implementing a security awareness
program for an entity
410
```
↓
```
Generating the security awareness program comprising a
plurality of actions, wherein at least one of the plurality of
actions comprises a simulated phishing campaign and wherein
at least another of the plurality of actions comprises an
electronic training campaign
420
```
↓
```
Automatically scheduling, to electronically represent a proposed
schedule of the security awareness program, in an electronic
calendar of a selected user account, each of the plurality of
actions as one or a meeting or a reminder based on a type of
action
430
```
↓
```
Automatically creating the reminder for an action of the
plurality of actions comprising the type of action that is not
included or displayed on a console of the device
434
```
↓
```
Generating, in the electronic calendar one or more graphical
representations of the simulated phishing campaign and the
electronic training campaign, wherein the one or more graphical
representation are selectable to display one or more metrics of
a corresponding campaign
440
```

```
Receiving attributes for implementing a security awareness
program for an entity
410
```

↓

```
Generating the security awareness program comprising a plurality
of actions, wherein at least one of the plurality of actions comprises
a simulated phishing campaign and wherein at least another of the
plurality of actions comprises an electronic training campaign
420
```

↓

```
Automatically scheduling, to electronically represent a proposed
schedule of the security awareness program, in an electronic
calendar of a selected user account, each of the plurality of actions
as one or a meeting or a reminder based on a type of action
430
```

↓

```
Generating, in the electronic calendar one or more graphical
representations of the simulated phishing campaign and the
electronic training campaign, wherein the one or more graphical
representation are selectable to display one or more metrics of a
corresponding campaign, and wherein the one or more metrics
comprises one of the following: percentage compliance, percentage
complete, statistics about user interactions with campaign.
436
```

```
Receiving attributes for implementing a security awareness program
for an entity
410
```
↓
```
Generating the security awareness program comprising a plurality of
actions, wherein at least one of the plurality of actions comprises a
simulated phishing campaign and wherein at least another of the
plurality of actions comprises an electronic training campaign
420
```
↓
```
Automatically scheduling, to electronically represent a proposed
schedule of the security awareness program, in an electronic
calendar of a selected user account, each of the plurality of actions
as one or a meeting or a reminder based on a type of action
430
```
↓
```
Generating, in the electronic calendar one or more graphical
representations of the simulated phishing campaign and the
electronic training campaign, wherein the one or more graphical
representation are selectable to display one or more metrics of a
corresponding campaign
440
```
↓
```
Wherein the electronic calendar is configured by the device to
display a file comprising details about a campaign when a graphical
representation corresponding to a completed campaign is selected
438
```

*Fig. 4E*

ASAP | Automated Security Awareness Program

Questionnaire Completion

How many of your users are going to be a part of this program?

- 0-24
- 25-50
- 51-100
- 101-500
- 501-1000
- 1001-2000
- 2001-5000
- 5000+

<<< Previous Question    Next Question >>>

Information

This question doesn't necessarily mean that you should enter your organization's employee count. It could be that not all employees will be in-scope for your security awareness program or you may need to include 'non-employees', such as 3rd party contractors.

Knowing the approximate number of end users in-scope enables ASAP to tailor a custom security awareness program suited to your organization's needs.

*Fig. 5*

ASAP | Automated Security Awareness Program

Questionnaire Completion

Which sectors best describe your company?

- Banking
- Business Services
- Consulting
- Education
- Energy & Utilities
- Financial Services
- Government
- Healthcare & Pharmaceuticals
- Insurance
- Manufacturing
- Not for Profit
- Retail & Wholesale
- Technology
- Other

Information

Organizations in different sectors have different risk profiles that need to be mitigated through security awareness training. Knowing the applicable sector(s) for your organization enables ASAP to better tailor the most effective security awareness program for you.

Select the sector(s) most applicable to your organization.

<<< Previous Question      Next Question >>>

*Fig. 6*

ASAP | Automated Security Awareness Program

Questionnaire Completion

How would you rate the maturity of your current program?

- Zero/Non-existent
  *Nothing is officially in place and there are no metrics*

- Low maturity
  *There are policies in place about training and people might have access to basic materials*

- Average maturity
  *Training is required by company policy. Users receive annual training and perhaps compliance training*

- High maturity
  *Policies exist and are enforced. Users are trained, and mechanisms are in place to shape and test user behavior. Relevant metrics are gathered*

[ <<< Previous Question ]   [ Next Question >>> ]

Information

Traditionally, security awareness hasn't been a program so much as a box to tick on an on-boarding checklist-and to some, an annual chore. As threat vectors continue to evolve, it's now more important than ever that security awareness becomes a vital and necessary part of the corporate culture.

As programs are planned and executed, they will typically go one of two ways. Either program will be successfully adopted, growing and evolving as needed, or the program will fail. The program that works one year is not necessarily going to work the next year. As regulatory requirements and the threat landscape continue to evolve, your training should adapt to meet those changes.

Select the maturity level of your current awareness program.

*Fig. 7*

ASAP | Automated Security Awareness Program

Questionnaire Completion

What level of maturity would you like to attain over the next 12-18 months?

- Low maturity
  *Basic training and limited visibility of the effectiveness*

- Average maturity
  *Structured training; scheduled awareness-raising exercises; actionable metrics*

- High maturity
  *Multiple training paths; broad and targeted phishing; additional threat vector training/testing*

<<< Previous Question   Next Question >>>

Information

Consider where you would like to see your program maturity a year from now. While it can be a challenge to transition from having no security program in place to becoming an industry leader in a short period of time, a well-designed security awareness program can help you achieve that goal.

Select the level of maturity you'd like your security awareness program to achieve over the next 12-18 months.

*Fig. 8*

ASAP | Automated Security Awareness Program

Questionnaire Completion

What would you like to have as the primary focus of your program?

- Security awareness delivery
  *Traditional security awareness training to get content in front of users*
- Compliance
  *Many organizations have to meet some sort of regulation or mandated security requirements*
- Physical security
  *This would cover physical security aspects such as clean desks, tailgating, and secure environments*
- HR training
  *Training on workplace violence, active shooter scenarios, and sexual harassment*
- Behavior change
  *Influence users to have better security practices through behavior changes*

[ <<< Previous Question ]     [ Next Question >>> ]

Information

Security awareness covers several different domains, industry compliance requirements, physical security concerns, and a user's behavior behind the keyboard all fall under the growing umbrella of security awareness.

*Fig. 9*

ASAP | Automated Security Awareness Program

Questionnaire Completion

What delivery channels do you want to include?

- Interactive training modules
  *Courses covering a variety of cybersecurity topics that you can enroll your users in*
- Videos
  *Downloadable videos that you can distribute to users which cover a wide variety of cybersecurity best practices*
- Posters
  *Downloadable posters that you can print, frame, and use in break rooms and public areas to keep security at top of mind*
- Newsletters
  *Downloadable eye-catching newsletters that you can distribute to users which focus on the latest and greatest in cybersecurity and general security practices*
- Interactive games
  *Games that challenge your users to test and reinforce their cybersecurity skills*

[ <<< Previous Question ]    [ Next Question >>> ]

Information

Consider the culture of your organization and the best method for delivering security awareness training and related information to your users.

Select all that apply.

*Fig. 11*

ASAP | Automated Security Awareness Program

Questionnaire Completion

What style(s) of training are you interested in?

- Serious
  A 'just the facts' style of training, focusing on what users need to know and understand to meet your security awareness program's requirements

- Humorous
  The more fun, the better. This would include colorful content using jokes and plays on words to keep your users engaged and excited

- Infographic & PSA-style
  Attractive infographics would be used to deliver training content. Public Service Announcement style videos, modules, and games would focus on the specific behavior changes you'd like to address <<< Previous Question      Next Question >>>

Information

Your company culture is unique and your security awareness program should reflect that.

Select the styles of training that would appeal to your organization and your users.

*Fig. 12*

ASAP | Automated Security Awareness Program

Questionnaire Completion

What primary languages and cultures do you need to support?

- English – American
- Arabic
- Chinese – Simplified
- Chinese – Traditional
- Czech
- Danish
- Dutch
- English – Australian
- English – British
- French
- French – Canadian
- German
- Hebrew
- Hungarian
- Italian
- Japanese
- Korean
- Norwegian
- Polish
- Portuguese – Brazilian
- Portuguese – European
- Russian
- Spanish – Colombian
- Spanish – European
- Swedish

[<<< Previous Question]   [Next Question >>>]

Information

Your security training program may need to accommodate users who speak different languages or live in different countries.

Select all the languages that you'd like to include in your program

*Fig. 14*

ASAP | Automated Security Awareness Program

Questionnaire Completion

What roles does your organization need specific training for?

- Executives
  *Training catering to C-levels and executive management who need to inspire awareness from the top-down and create a culture of awareness and learning within the organization*
- Typical office employee
  *Training catering to your average, non-technical user. Content should be presented in an easy-to-understand manner and cover a wide variety of general security topics*
- Call Center/Help Desk
  *Training focused on the threats facing employees who spend most of their time on phones, including those in call centers, at help desks and reception. Topics could include pretexting phishing, the importance of following policies, and more*
- General IT Staff
  *Training designed for your general IT staff, concentrating on the threats they face. Topics could include data protection, computer security, data loss, persona information protection, pretexting and more*
- Administrators
  *Training aimed at administrators. Topics include network security, data protection, data loss, and general security best practices*
- Developers
  *Training geared towards developers and programmers, focusing on the threats that they should be aware of. Topics include securing web applications, understanding the history of computer security, threat modeling, and more*
- Other
  *Type in the other role-specific training you would like to include in your security awareness training program*

[<<< Previous Question]   [Next Question >>>]

Information

Role-based training can help bolster the security savvy of your employees by focusing specifically on the threats that affect them.

Select as many as you will need to make your security awareness program thorough and complete.

*Fig. 15*

ASAP | Automated Security Awareness Program

Questionnaire Completion

Would you like to test your users with other attack vectors besides phishing?

- USB Drive Test
  Allows you to test your users on how they will react o finding unknown removable storage devices such as thumb drives
- EZXploit
  An automated social engineering pen-testing tool which you can add to any phishing campaign that you set up in your management console
- Artificial Intelligence Driven Agent (AIDA)
  Uses artificial intelligence multilayered attack scenarios to inoculate your users against sophisticated social engineering attacks
- Voice-Phishing (Vishing)
  Automated social engineering test to see if your users are prone to entering sensitive information through the phone when prompted
- None of the above

[ <<< Previous Question ]     [ Next Question >>> ]

Information

A comprehensive security awareness plan should test your users with multiple attack vectors, simulating real-life scenarios that they may encounter at work and at home. By simulating these attack, you can prepare your users with the knowledge they may need to prevent a successful cyber attack on your organization.

Select the attack vector(s) you are interested in testing your users with.

*Fig. 17*

ASAP | Automated Security Awareness Program

Thank you for answering the Questionnaire

Pick a date that you would like to start your Security Awareness Training on

By clicking the "Generate My Program" button below, you are on your way to establishing a mature, sustainable security awareness and security behavior management program. We are here with you to help ensure that you don't let anything fall through the cracks. With that goal in mind, we start you off with tasks such as gaining executive support, ensuring that you have your toolset in order, selecting the best content for your organizational culture, and more. These tasks are staged before any public 'go live' date within your organization. The date you select below indicates the date that you can begin these initial tasks.

Don't worry. ASAP gives you the ability to mark items as complete if they are already done, after duedates and durations, or even reset your target start date if needed. This is your program and we are here to help you succeed.

Generate Program >>>

*Fig. 18*

17. Create a training campaign for phishing test "clickers" (Estimated Duration: 30 mins)  Due on August 7, 2017

18. Create a monthly phishing campaign (Estimated Duration: 30 mins)  Due on August 14, 2017

As part of your questionnaire, you elected to phish your users monthly. This will be a great way to keep your users on guard and ready to analyze emails they receive with greater caution. Setting up this campaign to start after your initial training campaign will also help your users practice the skills they learned as part of training.

Our recommendations for setting up your ongoing phishing campaign are below, along with a video which will go into detail about the various options you have when creating your campaign.
-How to set up an ongoing phishing campaign
-Setting up a phishing campaign (Video)

After reviewing the resources above, set up your monthly phishing campaign here.

If you'd like to do remedial training on your phish-prone users, remember to "add clickers" to your Clickers group!

Note: As a best practice, we recommend phishing your users at least bi-weekly, so you may want to consider adding an additional monthly test to go to your high-risk employees, such as Executives, Accounting, or IT/Help Desk.

Mark as completed                                                                                                               Edit due date 19. Create a recurring, targeted, high-risk phishing campaign (Estimated Duration: 6 hours)  Due on August 17, 2017

20. Review and select posters to display around your organization (Estimated Duration: 1 hour)  Due on August 23, 2017

21. Review and select games to include in future training campaigns (Estimated Duration: 1 hour)  Due on August 22, 2017

*Fig. 20*

SYSTEMS AND METHODS FOR CREATING AND COMMISSIONING A SECURITY AWARENESS PROGRAM

RELATED APPLICATIONS

This application claims the benefit of and priority to each of U.S. Provisional Application No. 62/522,455, titled "SYSTEMS AND METHODS FOR CREATING AND COMMISSIONING A SECURITY AWARENESS PROGRAM" and filed Jun. 20, 2017 and U.S. Provisional Application No. 62/533,457, titled "SYSTEMS AND METHODS FOR CREATING AND COMMISSIONING A SECURITY AWARENESS PROGRAM," and filed Jul. 17, 2017, all of which are incorporated herein by reference in their entirety for all purposes.

FIELD OF THE DISCLOSURE

This disclosure generally relates to systems and methods for automatically creating an efficient and targeted security awareness program including specific components and the timing of the specific components. This disclosure further provides systems and method for determining and tracking, by a security awareness system, preferences for training across various industries, company types, and other company characteristics which can be used to customize the creation of security awareness programs, as well as to compare security awareness statistics across similar companies. This disclosure further provides systems and methods for automated scheduling and tracking of security awareness system events and the results of those events.

BACKGROUND OF THE DISCLOSURE

A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs. The total number of phishing attacks is increasing dramatically every year.

Many security threats, including social engineering, spear phishing and ransomware, target individuals in a company, and it is estimated that 95% of all security incidents involve human error. Therefore, security technologies are ineffective if an employee is the source of failure, making it necessary to provide security awareness training for users. After users are provided with training, users benefit from regular practice and refreshes of the training so that they do not inadvertently fall victim to an attack. It can therefore be useful to perform simulated phishing attacks on a user or a set of users. Simulated phishing attacks allow a company to determine the level of vulnerability to phishing attacks of a user or set of users. This knowledge can be used by Internet technology companys to reduce this level of vulnerability through tools or training, as well as to see how effective their training campaigns are.

There are many different aspects to a comprehensive security awareness program. Different companies have different needs, which are influenced by a range of diverse factors. Factors such as industry, size, preferences, regulatory requirements, geographic location and reach, and current awareness level all will impact how to design and configure an optimal security awareness program. Therefore, it is not possible to have a set of best practices that will work for all companies, and there is no one cyber security defense plan that will work for every company or industry.

Comprehensive security awareness programs include many different components. Some examples of security awareness program components are web-based training, interactive training, periodic phishing tests, industry or company specific templates for testing, tips and regular update bulletins, posters and signs, newsletters, vishing and spear phishing training and testing, USB device attacks training and testing. It can be understood that with such a wide range of influencing factors and such a broad array of security awareness program components, systems and methods for automated and customized security awareness program creation are required.

Additionally, once an optimized program is created for a company, there are many steps required to configure the program and the company's systems such that the program is ready to execute. Some examples of the steps required include whitelisting specific servers, setting up company specific information in the tool so that simulated phishing attacks look genuine, importing users and setting up active directory integration, setting up two-factor authentication for company administrators, and creating and customizing a landing page for users that fails tests. These steps are unfamiliar and burdensome for company administrators and require time consuming interactions with security awareness training provider help desks and resources.

A comprehensive security awareness program consists of many aspects that occur over time. A program may begin with a blind baseline test of a company's users, to determine the phish-prone percentage before the program begins. The program may then include periodic training requirements that happen at regular or irregular intervals. The program may also include periodic user testing, of varying types, at regular or irregular intervals. Comprehensive security awareness programs may span months or even years.

BRIEF SUMMARY OF THE DISCLOSURE

Detailed, customized and comprehensive security awareness programs comprising testing, training, and campaigns may be used to identify and train users that are susceptible to actual cyber-attacks, to lower their susceptibility risk. Creation of detailed and customized programs requires both specific company information in addition to intrinsic knowledge and experience of what type of program work best for a company with similar characteristics. Additionally, configuration of a detailed and customized program requires competencies and specific skills that most IT administrators in companies don't have. Accordingly, systems and methods are required for automatically configuring customized security awareness programs. Security awareness programs can run over a long period of time and the maturity of the company with respect to security awareness will change over the program period. Accordingly, there is a requirement for systems and methods by which a company can easily learn, for example, where they are in a security awareness program, how much progress has been attained by the company at any given stage of the program, and how much the program they have actual executed has varied from the optimized program generated by the security awareness training provider. Accordingly, systems and methods are required to automatically manage and track a dynamic and multi-faceted security awareness program over time.

Methods, systems and apparatus for implementing a security awareness program are provided which allow a device of a security awareness system to receive attributes for implementing a security awareness program for an entity, such as a company. Responsive to receiving the attributes, the device generates the security awareness program comprising a plurality of actions, wherein at least one of the plurality of actions comprises a simulated phishing campaign, and wherein at least another of the plurality of actions comprises an electronic training campaign. The device automatically schedules each of the plurality of actions as one of a meeting or a reminder, based on a type of action, in an electronic calendar of a selected account, to electronically represent a proposed schedule of the security awareness program. The device generates, in the electronic calendar, one or more graphical representations of the simulated phishing campaign and the electronic training campaign, wherein the one or more graphical representations are selectable to display one or more metrics of a corresponding campaign. The device initiates execution of the simulated phishing campaign to identify the percentage of users that are phish prone.

The methods, system and apparatus provided further enable the device to receive, via a user interface, attributes responsive to providing a questionnaire, via the user interface, regarding implantation by the company of the security awareness program. In one embodiment, the method, system and apparatus enable the device to automatically create the meeting for an action of the plurality of actions comprising the type of action that is one of included or displayed on a console of the device.

In one embodiment, the method further comprises comparing, by the device, the attributes for the company to attributes for other companies. The method further comprises determining, by the device, based on at least the comparison, the configuration of at least a baseline simulated phishing campaign, an electronic based training of users of the company for security awareness or one or more subsequent simulated phishing campaigns.

In one embodiment, the method further comprises determining, by the device, based on at least the attributes, the configuration of a baseline simulated phishing campaign or one ore more subsequent simulated phishing campaigns to include one or more of the following: a schedule, a type of simulated phishing attack, a type of exploit, and type of data to collect.

In one embodiment, the method further comprises identifying, by the device, based on at least the attributes, one or more training modules for the electronic based training of users of the entity for security awareness.

In one embodiment, the method further comprises identifying, by the device responsive to the execution of the baseline simulated phishing campaign, the percentage of users of the company that are phish prone.

In one embodiment, the method further comprises identifying, by the device responsive to the execution of the baseline simulated phishing campaign, the percentage of users of the entity that are phish-prone, wherein the percentage of users of the entity that are phish-prone comprises a number of users of the entity that clicked on a link of a simulated phishing email.

In one embodiment, the method further comprises automatically creating the reminder for an action of the plurality of actions comprising the type of action that is not included or displayed on a console of the device.

In one embodiment, the one or more metrics further comprises one of the following: percentage compliance, percentage complete, statistics about user interactions with campaign.

In one embodiment, the electronic calendar is further configured by the device to display a file comprising details about a campaign when a graphical representation corresponding to a completed campaign is selected.

In one embodiment, the method further comprises executing the one or more subsequent simulated phishing campaigns based on at least a result of the baseline simulated phishing campaign or the electronic based training of users of the entity for security awareness.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3D depicts an implementation of a method for implementing a security awareness program which comprises comparing the attributes for the entity to attributes of other entities and determining the configuration of at least one simulated phishing campaign or electronic based training.

FIG. 3I depicts an implementation of a method for implementing a security awareness program which comprises executing the one or more subsequent simulated phishing campaigns based on at least a result of the baseline simulated phishing campaign or the electronic based training of users of the entity for security awareness;

FIG. 4A depicts an implementation of a method for creating a security awareness program for an entity which comprises receiving attributes for implementing a security awareness program for an entity;

FIG. 4C depicts an implementation of a method for creating a security awareness program which comprises automatically creating the reminder for an action of the plurality of actions comprising the type of action that is not included or displayed on a console of the device:

FIG. 4D depicts an implementation of a method for creating a security awareness program which comprises generating, in the electronic calendar one or more graphical representations of the simulated phishing campaign and the electronic training campaign;

FIG. 4E depicts an implementation of a method for creating a security awareness program wherein the electronic calendar is configured by the device to display a file comprising details about a campaign when a graphical representation corresponding to a completed campaign is selected;

FIG. 5 is an illustration of a question about the number of users that will participate in the security awareness program, which is part of a questionnaire that is used to automatically create a custom security awareness program;

FIG. 6 is an illustration of a question about the industry sectors of the company, which is part of a questionnaire that is used to automatically create a custom security awareness program;

FIG. 7 is an illustration of a question about maturity of the current security awareness program of the company, which is part of a questionnaire that is used to automatically create a custom security awareness program;

FIG. 8 is an illustration of a question about the desired maturity of security awareness that the company wished to attain over a period of time, which is part of a questionnaire that is used to automatically create a custom security awareness program;

FIG. 9 is an illustration of a question about the desired primary focus of the security awareness program for the company, which is part of a questionnaire that is used to automatically create a custom security awareness program;

FIG. 11 is an illustration of a question about the best methods for delivering security awareness training and related information to the users of the company, which is part of a questionnaire that is used to automatically create a custom security awareness program;

FIG. 12 is an illustration of a question about the styles of delivering security awareness training and related information to the users of the company, which is part of a questionnaire that is used to automatically create a custom security awareness program;

FIG. 14 is an illustration of a question about the languages that need to be accommodated for the users of the company, which is part of a questionnaire that is used to automatically create a custom security awareness program;

FIG. 15 is an illustration of a question about the roles in the company that the company needs specific training for, which is part of a questionnaire that is used to automatically create a custom security awareness program;

FIG. 17 is an illustration of a question about which attack vectors besides phishing that the company wishes to use to train their users, which is part of a questionnaire that is used to automatically create a custom security awareness program;

FIG. 18 is an illustration of a screen which allows the selection of a start date for the security awareness program, and a selection to automatically create the security awareness program;

FIG. 20 is an illustration of screen in which one of the tasks which is part of the custom security awareness program that is generated by the system is expanded to show a description of the task and other resources related to the task, including a selection to edit the due date of the task and a selection to mark the task as completed;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for creating, configuring, scheduling and tracking a customized security awareness program and for determining and tracking, by a security awareness system, preferences for training across various industries, company types, and other company characteristics which can be used to customize the creation of security awareness programs.

A. Computing and Network Environment

Figure 1A:
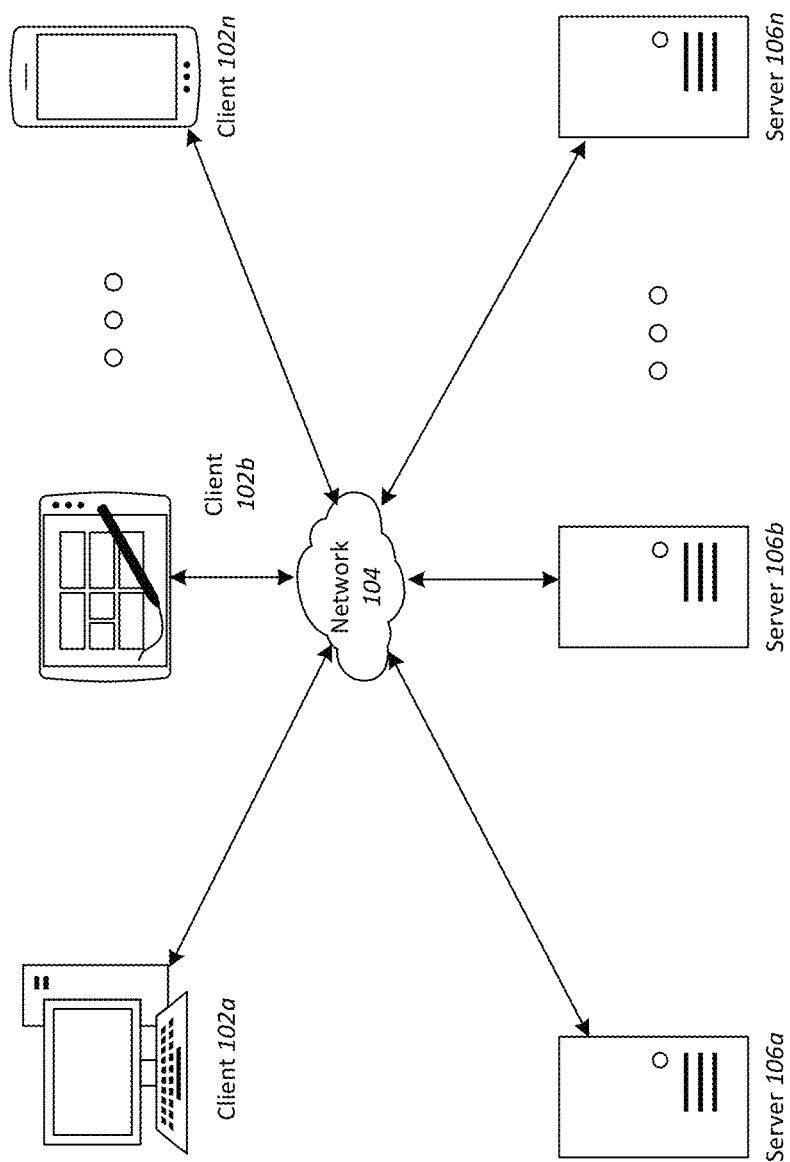
FIG. 1A is a block diagram depicting an embodiment of a network environment comprising a client device in communication with a server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the international Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LIE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers 106 may be referred to as a server farm (not shown) or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
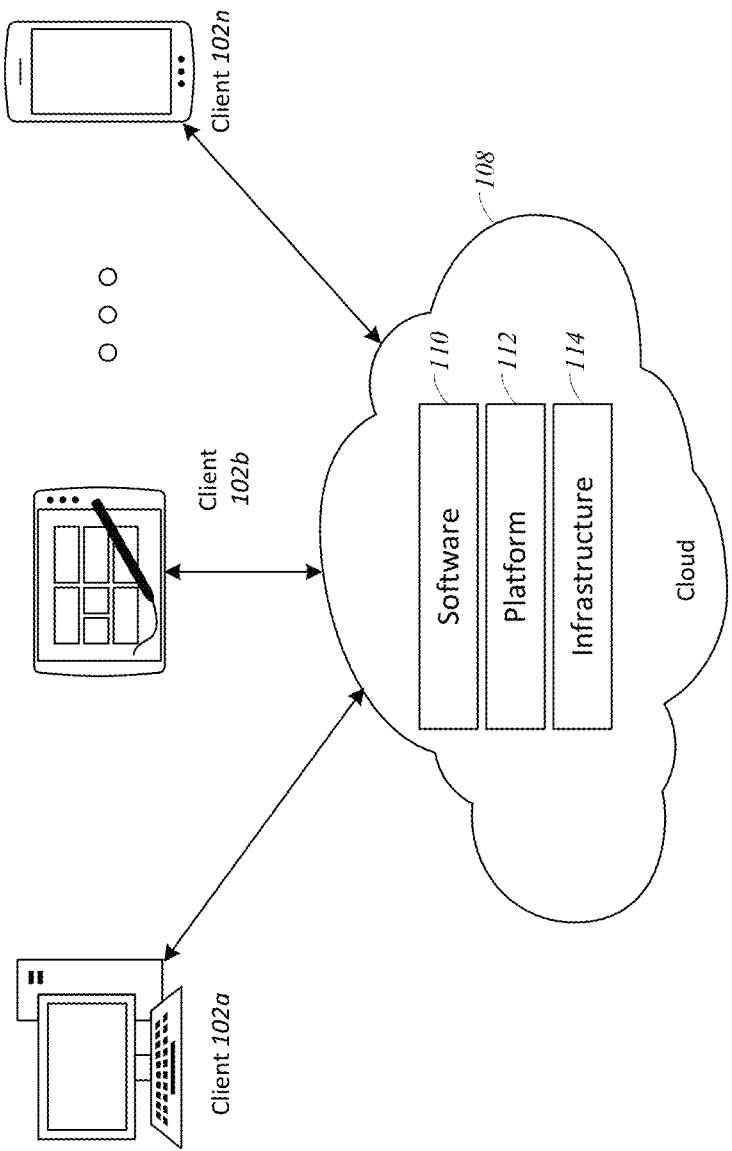
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with a cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients 102. The servers 106 may be located off-site in remote geographical locations as disclosed above or otherwise. Public clouds may be connected to the servers 106 over a public network. Private clouds may include private servers 106 that are physically maintained by clients 102 or owners of clients 102. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS 114 may refer to a user renting the use of infrastructure resources that are needed during a specified time IaaS providers may offer storage, networking, servers or virtualization resources from large pools, allowing the users to quickly scale up by accessing more resources as needed. Examples of IaaS 114 include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS 112 include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS 110 include GOOGLE APPS provided by Google Inc., SALESFORCE provided by Salesforce.com Inc. of San Francisco, Calif., or OFFICE 365 provided by Microsoft Corporation. Examples of SaaS 110 may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, Windows file system for DROPBOX.

In some embodiments, access to IaaS, PaaS, or SaaS resources may be authenticated. For example, a server 106 or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
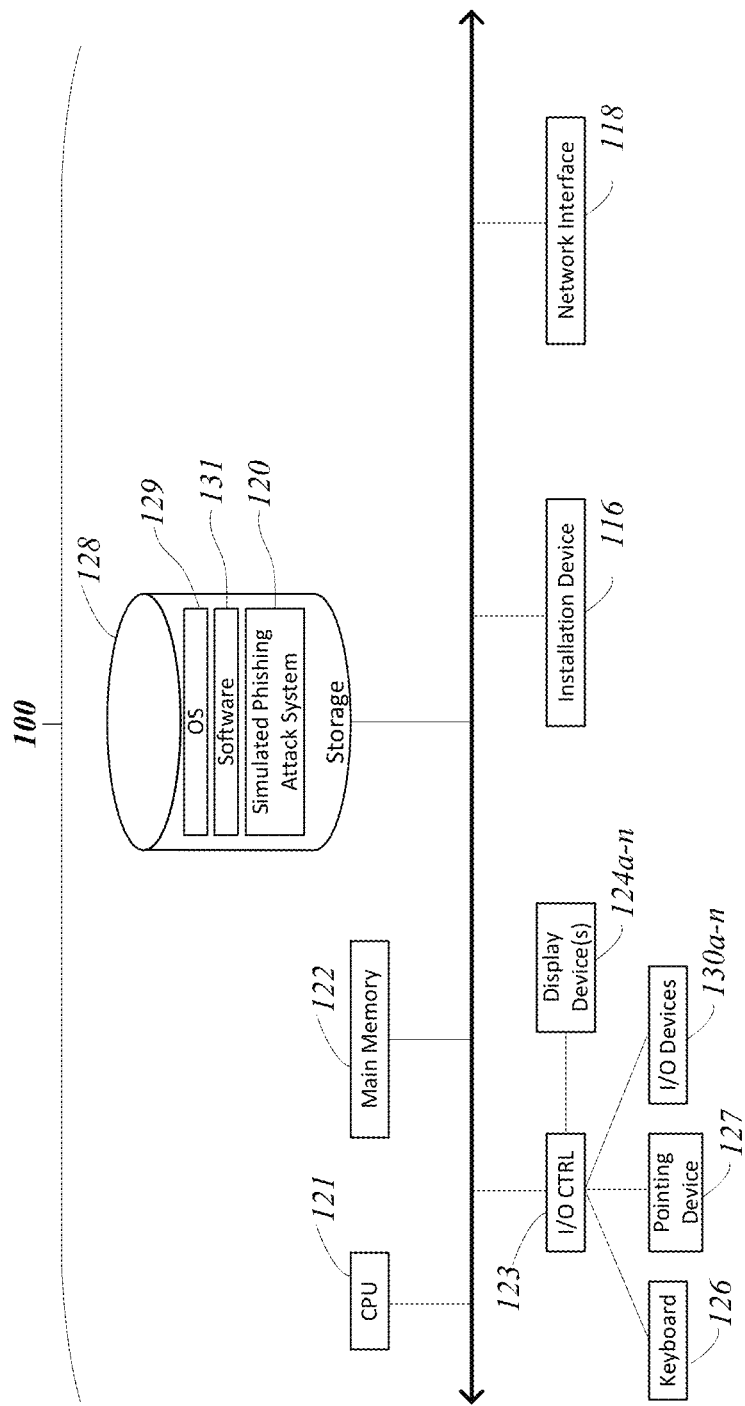
FIGS. 1C and 1D are block diagrams depicting embodiments of computing devices useful in connection with the methods and systems described herein.
Figure 1D:
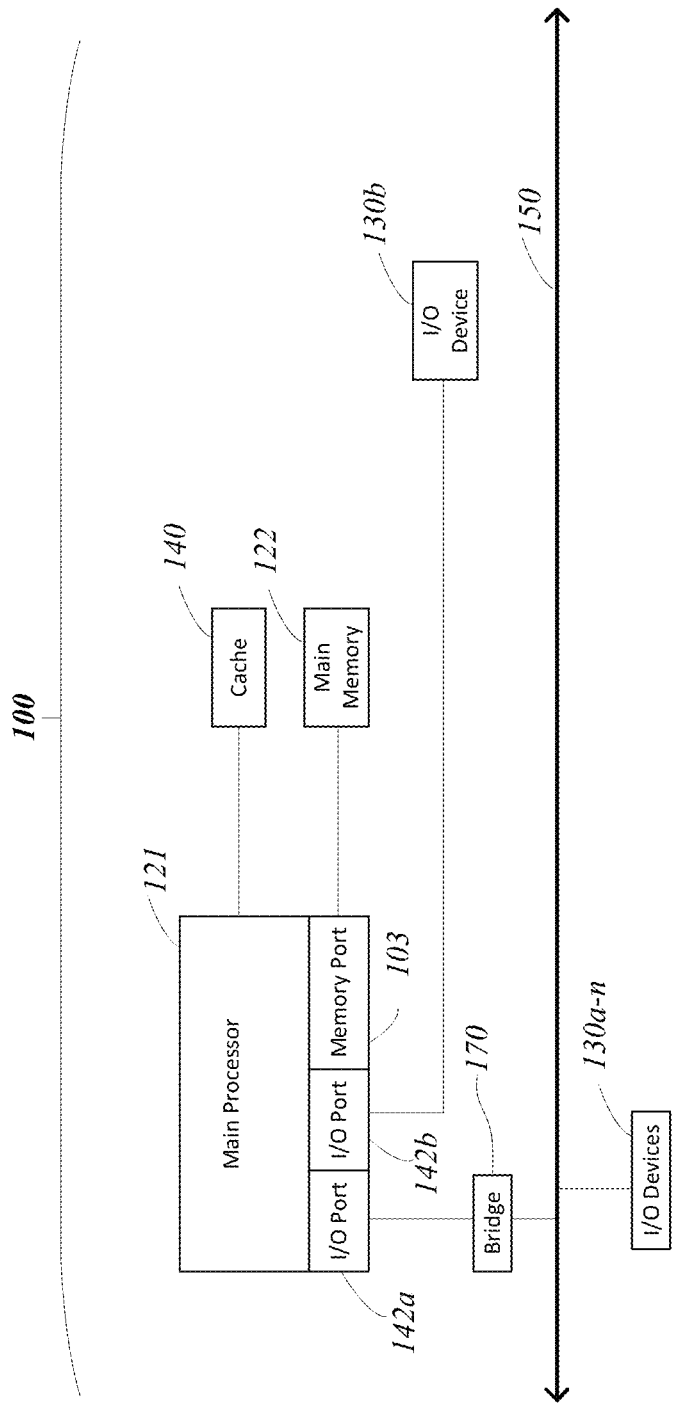

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit (CPU) 121, and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g. a mouse. The storage device 128 may include, without limitation, an operating system 129, a software 131, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), I/O ports 142a-142b, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.:

those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by international Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the central processing unit 121 (e.g., microprocessor). Main memory unit 122 may be volatile and faster than storage device 128 memory. Main memory units 122 may be Dynamic random-access memory (DRAM) or any variants, including static random-access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage device 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the central processing unit 121 (e.g., a main processor) communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the main processor 121 communicates with various I/O devices 130 via a local system bus 150. Various buses may be used to connect the main processor 121 to any of the I/O devices 130 via I/O ports 142a-142b, including a PCI bus, a PCI-X bus, or a PCI-Express bus, or a NuBus. For embodiments in which the I/O device is a video display device 124, the main processor 121 may use an Advanced Graphics Port (AGP) to communicate with the display device 124 or the I/O controller 123 for the display device 124. FIG. 1D depicts an embodiment of a computing device 100 in which the main processor 121 communicates directly with I/O device 130b or other processors 121' (not shown) via HYPERTRANSPORT, RAPIDIO, or INFINIBAND communications technology (via I/O port 142b). FIG. 1D also depicts an embodiment in which local busses and direct communication are mixed: the main processor 121 communicates with I/O device 130a using a local interconnect bus while communicating with I/O device 130b directly (via I/O port 142a).

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

I/O devices 130a-130n may include a combination of multiple input or output devices, including, e.g., Microsoft KINECT, Nintendo Wiimote for the WII, Nintendo WII GAMEPAD, or Apple IPHONE. Some I/O devices 130a-130n allow gesture recognition inputs through combining some of the inputs and outputs. Some I/O devices 130a-130n provides for facial recognition which may be utilized as an input for different purposes including authentication and other commands. Some I/O devices 130a-130n provides for voice recognition and inputs, including, e.g., Microsoft KINECT, SIRI for IPHONE by Apple, Google Now or Google Voice Search.

Additional I/O devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices 124a-124n may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (THOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b (not shown) connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the computing device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system 129 or other related software, and for storing application software programs such as any program related to the simulated phishing attack system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage device 128 may be non-volatile, mutable, or read-only. Some storage devices 128 may be internal and connect to the computing device 100 via a system bus 150. Some storage devices 128 may be external and connect to the computing device 100 via an I/O device 130 that provides an external bus. Some storage devices 128 may connect to the computing device 100 via the network interface 118 over a network 104, including, e.g., the Remote Disk for MACBOOK AIR by Apple. Some computing devices 100 (e.g., client devices 102) may not require a non-volatile storage device 128 and may be thin clients 102 or zero clients 102. Some storage devices 128 may also be used as an installation device 116 and may be suitable for installing software and programs. Additionally, the operating system 129 and the software 131 can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, CHROMEBOOKS.

The computing device 100 (i.e., computer system) can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computing device 100 may comprise a PLAYSTATION 3, or PERSONAL PLAY STATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAY, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 (i.e., client device) includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Automatically Configuring a Security Awareness Program.

This disclosure generally relates to systems and methods for automatically creating an efficient and targeted security awareness program including specific components and the timing of the specific components. This disclosure further provides systems and method for determining and tracking, by a security awareness system, preferences for training across various industries, company types, and other company characteristics which can be used to customize the creation of security awareness programs, as well as to compare security awareness statistics across similar companies. This disclosure further provides systems and methods for automated scheduling and tracking of security awareness system events and the results of those events using an electronic calendar.

A security awareness program is designed to test the readiness of a security system and of users of a company to handle security attacks that can cause the company or the users harm. A security awareness program may comprise baseline testing to assess the currently level of preparedness of a company. A security awareness program may comprise one or more training campaigns for users of the company. A security awareness program may comprise one or more simulated phishing attacks to test the readiness of a security system or users of a system to handle phishing attacks such that malicious actions are prevented. A simulated phishing attack or actual phishing attack may, for example, target many users, such as employees of a company or organization. Such attacks may be performed by a party friendly or neutral to the targets of the attacks. In one type of phishing attack, an attempt is made to extract sensitive information using phishing methods. For the simulated phishing attack, any extracted information is used not for malicious purposes, but as part of a process of detecting weaknesses in security. Performing the simulated phishing attack can help expose a lack of vigilance and/or know-how in a user or set of users of a device. In a security awareness program, the information learned from the simulated phishing attack can be used to provide targeted training or remedial actions to minimize risk associated with such attacks. For example, user know-how can be improved by providing targeted, real-time training to the user at the time of failing a test provided by the simulated phishing attack.

Phishing attacks occur frequently by way of phishing emails. Phishing emails are typically masqueraded as emails from parties known to the users, such as an executive of a company that employs the users. The phishing emails may be designed to appear interesting to the users, and may offer or promise, for example, access to an interesting tidbit of news, access to useful computer software, access to knowledge of how to perform a money-making scheme, or any other thing that may be of interest. In some embodiments, the phishing emails may request that the user perform a certain action, such as clicking on a link, providing sensitive information by replying to the email, or transferring money to an account owned by the attacker and then sending a reply email to confirm that the money has been transferred. A common attack vector used by phishing mails is to get users to click on links in an email or to click on links delivered in documents attached to phishing emails.

Because phishing attacks are designed to look real to the users that receive them, a sophisticated phishing attack will use information specific to a company to customize the attack, making it harder for users to recognize. There are many factors that may be used by a malicious party to create attacks that are harder for users to recognize. For example, knowledge about the company's industry, company's structure, the names of key employees, and the type of business conducted may all be useful to a malicious party in creating a phishing attack that is hard for users to recognize.

An effective security awareness program for a company or organization considers specific information about that company to make sure that the users of the company are prepared for both general malicious attacks and specific malicious attacks.

The present solution offers several benefits to security awareness system providers and to client companies with respect to cybersecurity training. The present invention may improve the effectiveness of a security awareness program with respect to user statistics related to simulated phishing campaigns as well as real world phishing attacks by creating and providing a customized program that is based in part on company specific information and information about companies that have aspects in common. Specifically, the present solution creates and asks scoping questions of a company administrator and based at least in part on the answers to the questions the system will create a customized security awareness program. In some embodiments, the present solution utilizes information from one or more different companies in creating a customized security awareness program. In some embodiments, the present solution creates aspects of a security awareness program and enables the company administrator to select additional aspects of the security awareness program. In some embodiments, the present solution utilizes results of a baseline security awareness test in the creation of a customized security awareness program. The present solution may automatically configure one or more aspects of the customized security awareness program for the company. In one embodiment, the system may present a questionnaire to a company administrator to learn more about the company. In some embodiments, the system uses artificial intelligence to analyze information provided by one or more companies to create preferences and trends for security awareness programs across companies with similar characteristics. In some embodiments, the system additionally uses simulated phishing-prone test results from companies to determine what kind of security awareness program is most efficient for a given company.

The present solution functions by querying one or more administrators or users of a plurality of administrators or users of a company using a questionnaire which comprises questions that are relevant to security awareness program generation. In some embodiments, the questionnaire is customized for the company. In some embodiments, the questionnaire has one or more standardized questions. The present solution may create an initial or baseline simulated phishing test for the company and may execute the baseline simulated phishing test and track the results. The present solution may use one or more of the questionnaire results, the baseline simulated phishing test results, and historic information about other companies to create a customized security awareness program for a company. In some embodiments, the customized security awareness program is fixed for the duration of the program. In some embodiments, the customized security awareness program can change during the duration of the program, responsive to user's actions. In some embodiments, the system automatically configures one or more aspects of the customized security awareness program. In some embodiments, the system provides a personalized checklist for the company administrator to follow in creating a customized security awareness program.

The present solution has several possible applications. For example, the present invention can ensure that a company receives the security awareness program that is likely to be the most effective for them. In some embodiments, the information received from a company in response to a questionnaire can be used to inform the creation of new security awareness program training materials. In some embodiments, the security awareness system provider uses one or more of the information received from a company in response to a questionnaire and the results and success of a security awareness program for the company to generate best practices for security awareness programs.

The present solution is also configured to provide to a security awareness system administrator templates for a security awareness program. In some embodiments, one or more templates are provided to make stakeholders aware of the security awareness program. In some embodiments, one or more templates are provided to inform employees of the company about the security awareness program. In some embodiments, one or more of company or industry specific regulatory requirements, company or industry size, and company role in the industry are used by the security awareness system provider to suggest training modules for the company. In some embodiments, the security awareness system provides one or more of a dashboard and metrics to show how well the program is working. In some embodiments, one or more of a dashboard and metrics are automatically and regularly updated based on the results of simulated phishing campaigns. In one embodiment, the system uses the analytics gained through the present solution to provide to companies targeted inline tips, recommendations and industry specific data. In one embodiment, when a company administrator needs to make choices in setting up a security awareness program for the company, the system provides one or more of tips, information, and videos to guide the company administrator's choices. In some embodiments, the one or more of tips, information, and videos are provided before the company administrator makes their choices. In some examples, the materials, tips, and information explain the pros and cons of the company administrator's choices after they have made their choices. In some embodiments, the present solution provides a method for the company administrator to review and approve the training and campaigns that are proposed by the system before the security awareness program is finalized.

The present solution provides several benefits. Currently, for company administrators that wish to put together a security awareness program, there may be a long best practices guide, and from this guide the company administrator would need to determine what training they want to provide to their users. The company administrator must also decide the timing of the training campaigns, the number and type of simulated phishing campaigns, the training campaigns, and the types of auxiliary materials that they should use. The company administrator may have no knowledge or experience in security awareness programs and so it may be very difficult for them to put together an effective program. Selecting the elements of a program is also very time consuming. As the amount of available training materials continues to increase, it will get harder and harder for a company administrator to efficiently choose what materials to use. The present invention is managed at a server and requires limited or no interaction from an administrator at the security awareness program provider. The present invention provides the benefit of incorporating specific company information into the security awareness program design. The present invention provides the benefit of more accurate and timely compliance for regulatory requirements that are industry specific and no client software needs to be installed and the client side does not need to manage or be aware of the service. The present invention provides the benefit of building intelligence at the security awareness system provider with respect to preferences that are specific to characteristics at a company or organization. The present invention provides the benefit of assisting a company with one or more aspects of configuring a security awareness program.

The present solution automates and greatly speeds up the ability to customize a security awareness program for individual companies. Additionally, the invention automatically creates a step by step checklist for a company administrator to configure their customized security awareness program. Additionally, the invention is capable of automatically configuring and creating parts of the security awareness program on behalf of a company administrator. The present solution enables the system to collect information about the desired phishing security targets and goals for companies with specific attributes, and it can use this information to tailor the types of campaigns and training programs it can offer, along with the types of training materials that it has in its libraries. In some embodiments, the main steps in the present solution are as follows: a) company administrator is presented with questions in a scoping process; b) company administrator answers the questions; c) system collects information based on company details along with the answers provided by the company administrator; d) company administrator is presented with a security awareness program that reflects their answers to the questions in the scoping process; e) company administrator will browse and select training materials from content that is suggested for their company based on the answers to the questions in the scoping process; f) system will automatically create a customized interactive calendar with selected and suggested training actions; g) system may configure aspects of the training program on behalf of the system administrator; and h) system will use information collected during the scoping process and when the company administrator has selected specific training materials from the content libraries to learn and be able to create more targeting training campaigns and materials.

The result is a full security awareness program that a company may begin to use through their customer portal on the security awareness system. The company administrator is also able to print out the details of their custom program. The details of the custom program may contain the following: a) overview of the program; b) checklist of best practices for a security awareness program; c) getting started guide for setting up the company's console if they are going to do it themselves (for example, how to import users, how to install any plug-ins required for their email client, how to whitelist specific domains and URLs, etc.). In some embodiments, the company administrator may choose to have the security awareness system set up their console; d) links to internal use templates to make shareholders aware of the program (e.g. mail, letter, or memo templates to send to senior leadership of the company); e) links to internal templates to share with staff (e.g. email, letter or memo templates to inform the employees about the security awareness training that they will be undertaking); f) detailed instructions about how to kick off the program internally, for example how to prepare staff, how to advertise the beginning of the program and goals of the program, etc.; g) suggested primary training modules to guide the company administrator's selection of their desired training modules; h) suggested compliance training modules based on company specific regulatory requirements, industry, size, etc. based on information provided in the scoping process; i) suggested ancillary training components (e.g. newsletters/videos/posters, including when and how to use them) to guide the company administrator selection of their desired ancillary training components; j) suggested ongoing and remedial training modules to guide the company administrator's selection of their desired ongoing training and remedial training modules; k) instructions of what training campaigns to set up, and guidelines required to correctly set these up. The system may set up one or more training campaigns based on the provided company information; l) instructions on additional campaigns such as USB and vishing when applicable, and guidelines required to correctly set these up. The system may set up one or more additional campaigns based on the provided company information; m) a checklist of actions to be done, in some embodiments this is interactive with dates of completion; n) a calendar of events, which may include system automated actions that will occur (such as campaigns, training programs, and testing) as well as additional or supplemental actions to be done, for example putting up posters, changing visible materials in the workplace, etc.; and o) a dashboard and metrics that show how well the program is working, and that may be automatically and regularly updated based on the results of simulated campaigns that test user readiness.

In parts of the program creation where the company administrator needs to make choices, the system may present links to tips, information, and videos to provide information to the company administrator to guide those choices. In some embodiments, the materials, tips and information explain the pros and cons of the company administrator's choices after they have made their choices. In some embodiments the materials, tips and information are provided before the company administrator has made their choices. When the system generates a printed version of the program, the printed version may be automatically customized to remove online-only features and is geared towards being a reference guide or packet that could be shared with stakeholders that aren't using the console. The system can also offer the company administrator a series of choices as to what they want to be included in the printed version of the program.

In some embodiments, the system provides a method for the company administrator to review and approve the training and campaigns that are proposed by the system, and then the system is configured to automatically configure the program in the company console without the company administrator needing to know how to do the configuration themselves.

In some embodiments, the system comprises a scoping process. The scoping process will be a series of questions with selectable answers. These answers are used by the security awareness system to create a customized program recommendation. In some embodiments, the scoping process generates a program recommendation. The resulting program recommendation may include a combination of training materials and training and assessment campaigns that is customized to the company. In some embodiments, the system provides an overview of the program. The overview of the program will step the company administrator through all the tasks that are required to set up their security awareness program. In some embodiments, the security awareness system will perform some of the steps for the company administrator. In some embodiments, the security awareness system will prompt the company administrator for approval prior to implementing some steps of setting up the company's security awareness program. In some embodiments, the system provides a checklist of best practices for a security awareness program. The system provides information to the company administrator about what their security awareness program could look like. In some embodiments, the security awareness program comprises three foundational steps: 1) a baseline phishing test to determine a company's phish-prone percentage, 2) security awareness training for all users, and 3) ongoing phishing campaigns to allow the users to practice the skills they have learned in the security awareness training.

In some embodiments, companies are provided with information according to a high awareness plan, a medium awareness plan, and a low awareness plan. In some embodiments, the system provides a getting started guide to the console (user import, PAB, whitelisting, etc.). In some embodiments, the company administrator is instructed on the steps they need to take to successfully use the security awareness system console. In some embodiments, the company administrator first needs to whitelist the security awareness system's mail servers before the company administrator sends out any simulated phishing emails, such that these simulated phishing emails are not blocked entirely or end up in the user's junk or spam folders. The security awareness system may instruct the company administrator to run a test campaign to make sure the whitelisting was done properly. In some embodiments, the system may run the test campaign on behalf of the company administrator to make sure the whitelisting was done properly. In some embodiments, the second step is importing users of the company to allow them to be set up to receive simulated phishing and other simulated social engineering campaigns, to take security awareness training, etc. In some embodiments, this can be done by synching the security awareness system console with the company's active directory. The security awareness system provides an active directory integration manual explaining how to do this, as well as an instructional video. In some embodiments, the security awareness system may execute this step on behalf of the company administrator. In some embodiments, importing users can be done by preparing a CSV file and importing it into the console, or by doing a quick import if there are not too many users to enter. The security awareness system additionally works with the company administrator to set up any groups that they wish to create, which can be used for targeted phishing and training campaigns for specific employees.

In some embodiments, the system provides detailed instructions about how to kick off the program internally. After the system imports the users and sets up any desired groups, the system may instruct the company administrator on how to conduct a baseline phishing test for their employees. The system may create this campaign with a set of recommended settings as follows:

Recommended setting for initial baseline phishing test:
Name: Baseline Test
Deliver To: All Users
Frequency: One time
Start time: Select the day/time (Monday or Tuesday is recommend, and a time when users are active and checking mails is best)
Sending: Send all emails when the campaign starts
Track Activity: At least 3 days
Reply-To: On
Templates: IT--->Change of Password Required Immediately
Difficult Rating/Phish Link Domain: Leave as-is
Landing Page: If you'd like, you can choose a different landing page here, such as the 404 page, blank pan, or a custom landing page that you've created.
Add Clickers To: Select a group if this feature is being used (if you are unsure, leave this blank)
Send email report: Checked (email report will be sent to the admires when duration is met)

In some embodiments, the system then instructs the company administrator on how to train their users, or in one example the system sets up the training program automatically. An example of recommended settings is as follows:

Recommended settings for an initial training campaign for all staff:
Name: Security Awareness Training for All Users
Start Campaign At: Set as applicable
End Campaign At: Select a Relative Duration of 3 weeks.
Courses: Kevin Mitnick Security Awareness Training—45 Min
Enroll Groups: Select All Users (Check box to auto-enroll new users)
Check all four email notifications:
Send welcome email which contains the link for your users to confirm their account.
Remind users who have not started X days after the campaign starts.
Reminder users who have not completed the campaign X days after the campaign starts.
This will create a training program for all of your users, and as you add new users to the console in the future they will be automatically enrolled and receive a welcome email. Each user will have three weeks to complete the training. You can manually initiate "nudge" emails from within the console if users are taking too long to complete the training.

In some embodiments, once the users have completed the training, the system recommends or creates ongoing phish ing and training campaigns. Sample recommendations are as follows:

Ongoing Phishing Campaign Recommendations:
At a minimum, send a monthly phishing test to all users.
Include multiple email categories and types (Attachment tests, phishing, spear-phishing, reply-to).
Spread emails out over a longer duration, such as one week, so users will not know when they are going to be phished.
Add clickers to a remedial group (For example, you can call the group "Clickers" or "Phish-Prone users"), and assign this group additional training.

Ongoing Training Recommendations:
Create a remedial training campaign. On your Remedial Training Campaign settings, you can choose to remove users from the Clickers group once they complete training, and enable them to take the training multiple times. See article here: How To Set Up Remedial Training and video here: Remedial Training Campaigns
Train specific groups as needed on various specialty courses (Handling Sensitive Information, Mobile Device Security).
Send out monthly "Security Hints and Tips" emails from the phishing templates area to all users.
Set up a weekly "Scam of the Week" newsletter to keep your users aware and ready to defend against the latest phishing and social engineering scams. See: How to Set Up a Scam of the Week Newsletters In some embodiments, the company administrator can view and pull content from an online content library store. The store also can filter the content offered to the company based on the company's subscription level. Additionally, the content can be sorted in various ways. In some embodiments, the content is ranked by the security awareness system based on its applicability to the company (as determined by the system based on the company administrator's answers to the questionnaire). In some embodiments, the content is ranked by popularity ratings from other companies that have used the content. In one example, the content is ranked based on one or more specific characteristic of the company, such as the company's industry, the company's size, the company's regulatory environment, etc. In some embodiments, a company administrator can preview content directly from the content library store and then pick or select what they want to have as part of their program. In some embodiments, a company administrator can change this content in the future while the program is ongoing.

Scoping Process

In some embodiments, there is a primer of questions that influence a rules engine that runs in the background. Examples of scoping questions are given below:

In some embodiments, one of the scoping questions is "Do you have any industry compliance requirements?" If the company administrator checks off one of the compliance requirements, then in the background the rules engine uses this information to narrow the possible selections of training modules. In some embodiments, if the company administrator selects "HIPAA", then the rules engine will include selections for HIPAA modules that they should implement. In some embodiments, the rules engine has knowledge of different compliance modules for each of the selectable industry compliance requirements.

In some embodiments, another question that is asked of the company administrator is what their primary focus of the security awareness program is. The company administrator may be asked whether their focus is security awareness delivery, or compliance or behavior modification. The company administrator can select one or more focus areas. In response to the selection by the company administrator, the system may make decisions about the type and frequency of the campaigns and training. For example, if the company administrator wants behavior modification, then the system will create the program to do more frequent simulated phishing campaigns so that the user has more chances to learn the correct behaviors.

In some embodiments, if the company administrator selects behavior modification, then a question asked of the company administrator is "What are the three behavior changes that you would like to focus on?" In some embodiments, there are a limited number of different answers that the company administrator can choose from. In some embodiments, there is also an open text field. Some examples of options and an example of the system response to them being selected is as follows:

Clicking links—if selected, the system may perform a simulated phishing security test to find out how users will react to presented links. If selected the system may suggest or create simulated phishing campaigns with embedded links in the simulated phishing emails. The system may also present training selections related to clicking on unknown links.

Better passwords—if selected the system may present training selections related to choosing strong passwords.

Opening attachments—if selected, the system may perform a simulated phishing security test to find out how prone users are to opening unknown attachments. If selected the system may present training selections related to opening attachments. The system may also suggest or created simulated phishing campaigns with attachments that contain threats.

Reporting incidents—if selected the system may present options that help the company users report suspicious emails. For example, the system may suggest or may install the phish-alert-button (PAB) in the customer's email client. The system may also present training selections that are designed to teach users how to report suspected phishing attacks.

Clean desks—if selected, the system may suggest training materials and other ancillary materials (such as posters or other materials that can be distributed around a physical office space).

Safe web-browsing if selected, the system may perform a simulated phishing security test to find out how safe users are when web browsing. If selected, the system may suggest training materials and other ancillary materials (such as posters or other materials that can be distributed around a physical office space).

Tailgating—if selected, the system may suggest training materials and other ancillary materials (such as posters or other materials that can be distributed around a physical office space).

Safe social media practices—if selected, the system may perform a simulated security test to find out how safe users are when using social media. If selected, the system may suggest training materials and other ancillary materials to post in the workplace. The system may also suggest or create some online simulated training sessions using social media vectors to train users.

Physical device security (USB)—if selected, the system may perform a USB security test to find out how users will react to unknown USB. If selected, the system may suggest training materials and other ancillary materials to post in the workplace. The system may also suggest or create some online simulated training sessions using social media vectors to train users.

Mobile device security—if selected, the system may perform a mobile device security test to find out how users will react to unknown USB. If selected, the system may suggest training materials and other ancillary materials to post in the workplace. The system may also suggest or create some online simulated training sessions using social media vectors to train users.

In some embodiments, another question that may be asked of the company administrator is "What sector and vertical are you in?" in some embodiments, the options that are presented to the company administrator to select from are pulled from defaults in SalesForce. An example of the sectors in some embodiments is as follows:
1. Utilities
2. Financial Services
3. Banking
4. Technology
5. Manufacturing
6. Government
7. Healthcare & Pharmaceutical s
8. Insurance
9. Not for Profit
10. Business Services
11. Consulting
12. Education
13. Energy & Utilities
14. Retail & Wholesale
15. Other (text entry)

The knowledge of the sector and vertical may not directly change how the program is run but may allow the system to know the reference space of the company, which can allow the system to collect metrics and correlated these metrics in an industry specific way. The data can be redacted and used to generate industry specific statistics.

In some embodiments, another question that may be asked of the company administrator is "What is your company's tolerance/preference for mandatory interactive training frequency?" An example of the selection options in some embodiments is: a. Monthly, b. Quarterly, c. Biannually, and d. Yearly. The company administrator response to this question may relate to how the invention determines scheduling of simulated phishing campaigns. The system may put a lot of emphasis on this question to suggest and guide the company to do more frequent training depending on what their tolerance is for the frequency.

In some embodiments, another question that may be asked of the company administrator is "What delivery channels do you want to include?" Here the company administrator can select multiple options. An example of the selection options in some embodiments is: a. Interactive training modules, b. Short video for use on your intranet, break rooms, and digital signage, c. Downloadable posters, d. Newsletters, e. Interactive games.

In some embodiments, another scoping question is "What styles of training are you interested in?" In some embodiments, the company administrator may select more than one option. Example of the selection options in some embodiments are: a. Serious (i.e. just the facts), b. Humorous, c. Infographic and Public Service Announcement.

In some embodiments, another scoping question is "What type of content fits your culture best?" In some embodiments, the company administrator may select more than one option. Example of the selection options in some embodiments are: a. Animated content, b. Live action or photo-realistic content. In some embodiments, the company administrator's responses to these questions may guide the system in determining what the system will suggest in terms of how to deliver the selected training. In some embodiments, the system uses the responses to these questions to help the system uncover needs for what is being requested in certain industries and segments so that the system can create or design more training if it is found to be in demand. For example, the system may determine that the health care industry loves to use infographics, and the banking industry hates to use infographics. In some embodiments, based on aggregated information, the system will learn to create programs for each industry that are more aligned with the general trends in that industry. In this way, the tool delivers insights into what people are doing and what they want to do in their industries or segments.

In some embodiments, another question asked of the company administrator is "Do you need role-based training?" In some embodiments, the company administrator may select more than one option. Example of the selection options in some embodiments include:
a. Executives links—Training executives on what actions to take with their mobile devices and reporting when they are lost.
b. Call Center/Help Desk—Help desk staff are very helpful and often will reset a password without properly authenticating the user, leaving an opening for a malicious attack.
e. IT Staff—Many IT staff have administrator privileges and often work all day with this access, and must be trained on how to properly use these privileges.
d. Developers—Inherently developer develop insecure code and should be trained on how to embrace securing coding practices. In most penetration tests the exposures to the company are within the code on webservers.
e. General Employee—Train all employees on the fundamentals of good security practices.

In some embodiments, if the company administrator selects one of more of these options, then the system may make suggestions for creating multiple training campaigns that are specifically designed to target these classes of users.

In some embodiments, another question asked of the company administrator is "What is the maturity of your current program?" Example of the selection options in some embodiments are: a. Zero—we do nothing now, b. Low maturity, c. Average maturity, d. High maturity—we can set the bar for our peers. The answer to this question may help the system determine how much awareness the company has at the start of the program, and therefore how much training is likely to be needed. In some embodiments, another question asked of the company administrator is "What level of maturity would you like to attain over the next 12-18 months?" Example of the selection options in some embodiments are: a. Low maturity, b. Average maturity, c. High maturity—we can set the bar for our peers. In some embodiments, the answers to these questions may be used by the system to judge how well their users are doing when they first created the campaign compared to when they implement the plans. With the company's currently level of maturity the system can let the company know how their users are doing compared to other companies of the same maturity level. For example, if the company administrator selects the maturity of their current program as low, then the system can compare the results of their training campaigns with other companies that similarly indicated the maturity of their current programs as being low, and then the system can let the company know how they rank with respect to peers at the same maturity level. The answer to the second question indicates how much progress the company wishes to make in each time scale. The answer to this question can help the system determine the intensity of the proposed cybersecurity awareness program.

In some embodiments, another question asked of the company administrator is "What PRIMARY languages and additional cultures to you need to support?". Another question asked of the company administrator may be "What SECONDARY languages and additional cultures do you need to support?" In some embodiments, the company administrator may select multiple responses. In some embodiments, the system uses the language information when specifying content.

In some embodiments, another question asked of the company administrator is "How often would you like to train your users with simulated phishing emails?" In some embodiments, the answer to this question impacts how many times the system will schedule simulated phishing campaigns. Example of the selection options in some embodiments are: a. Weekly, b. Biweekly, c. Monthly, d. Quarterly, e. Annually. The answer to this question may be used by the system to learn preferences that may be aggregated to understand industry trends, for example.

In some embodiments, another question asked of the company administrator is "What categories of phishing test emails would you like to send to your users?" In some embodiments, another question asked of the company administrator is "What categories of phishing emails would be appropriate for your company?" Example of the selection options in some embodiments are: a. Business, b. IT, and c. Social Media. In some embodiments, the system may have many different categories of simulated phishing email templates, and the answers to these or similar questions helps the system determine which category to propose templates from. The answer to this question may also be used by the system to learn preferences that may be aggregated to understand industry trends, for example.

In some embodiments, another question asked of the company administrator "Would you like to test your users with other attack vectors besides phishing?" Examples of the selection options in some embodiment are: a. USB drive security test (this test looks to see how users will react to unknown USBs, for example if they open files on the USB or insert the USB in their computer). b. Automated social engineering penetration testing, c. artificial intelligence driven agent for various attack vectors of social engineering, and d. vishing. The response to this question tells the system what other types of campaigns that they can set up in creating the cybersecurity awareness program to address the company's interests.

In some embodiments, another question that can be asked of the company administrator is, "Would you like a CEO announcement letter?" (Yes/No). In some embodiments, another question that can be asked of the company administrator is "Would you like help and templates in building your business case and support for gaining executive buy-in?" (Yes/No). In some embodiments, another question that can be asked of the company administrator is "Would you like help and templates for building a 'security advocate' program across the divisions of your company?" (Yes/No). In some embodiments, the system will include these questions on one page, and the answers will be included as part of the printed version of the program. If the company administrator answers yes to one or more of these questions, the system may generate a template for a sample letter from the CEO and a template for a sample letter of how to share the cybersecurity awareness training program with other stakeholders and employees in the company.

Resulting Program

The system may use a system of metadata. In some embodiments, all training material may be tagged with metadata, and these tags may correlate to the scope questions in the present solution. In this way, the system can assemble appropriate content based on the company administrator selections in the scoping process. In some embodiments, the answers to the scoping questions may be combinatorically weighted and combined into a score which the system uses to select appropriate training content and simulated attack program design. In some embodiments, the system tracks compliance to the suggested program. In some embodiments, the system measures the company's improvement from the start of the program to the end of the program in terms of phish-prone percentage. In some embodiments, the system compares pre-program phish-prone percentage of a company with other companies that share similar attributes, as determined by the answers to the questionnaire. In some embodiments, the system compares the improvement in phish-prone percentage of a company with other companies that share some similar attributes, as determined by the answers to the questionnaire, to refine the design of the programs for companies with similar attributes. In some embodiments, the system compares the improvement in phish-prone percentage of a company with other companies that do not have similar attributes, and uses this information to refine the design or programs for other companies. In some embodiments, the system compares ongoing phish-prone percentages of companies with some similar attributes to provide to the companies their relative standing in a group of peer companies.

In some embodiments, the system calculates the correlation between compliance to the suggested security awareness training program and the reduction in phish-prone percentage to determine which aspects of a security awareness program are the most effective. In some embodiments, the system monitors the compliance of a company in executing the suggested program, and if the company is not executing the program according to the plan, the system prompts the company to become compliant with the suggested program. In some embodiments, the system monitors the compliance of a company in executing the suggested program, and if the company is not executing the program according to the plan, the system automatically adds the missing elements of the program (i.e. the elements that have not been executed) to the company console such that they will be executed. In some embodiments, the output of the scoping process is a checklist with information and instructions for the implementation of those items on the checklist. The system may inform the company, "These are the main things you need to look at. You need to look at who you're sending it to and what you're sending. For training campaigns, you need to make sure that you're using the option to allow people to be enrolled in the future. Those are the two things you care about for this particular type of training session. If you want more data, go here (and that will take you to the full documentation).

In some embodiments, the calendar that is created to show the sample company program is linked via a web connection such that the company administrator can look at the calendar in their console. In some embodiments, the company administrator can choose to implement the calendar by clicking a link, and if the company administrator clicks the link then the system inputs all the actions in the calendar into the company administrator's calendar as meetings. In some embodiments, if the company administrator chooses to implement the calendar by clicking a link, then the events that can be scheduled automatically in the console (such as simulated phishing attacks and training campaigns) are automatically added to and scheduled in the company console, and the actions that are not managed through the console, such as putting up posters around the office, are added as reminders to the company administrator's work calendar.

In some embodiments, the calendar which represents the proposed program is overlaid over a second calendar which shows what the company administrator has implemented in the console. In some embodiments, the system generates a graphic that illustrates all the past and ongoing training campaigns and phishing campaigns, and the company administrator can mouse over the various campaigns and the system will show the company administrator the metrics of the ongoing training and phishing campaigns, for example percentage compliance and percentage complete for training campaigns, and statistics about user interactions with simulated phishing attacks for the phishing campaigns. In some embodiments, if the company administrator clicks on a past or ongoing training or phishing campaign, the system will open a file showing the full details about it. In some embodiments, the system automatically downloads the past or ongoing training or phishing campaign information to an administrative dashboard of the company when the administrator clicks on it.

An additional feature of the invention is the ability to calculate and display high level statistics. These statistics show how the companies' performance has changed at various stages through the program execution and at the end of the program, and how this compares to statistics of companies that share classifications (e.g. industry, segment, size, geographic location, maturity level, etc.) In some embodiments, the system allows the company administrator to change answers to some of the scoping questions while their program is underway, and the system will automatically adjust the remainder of the program to consider the new answers to the questionnaire. In some embodiments, the comparison between phish-prone percentages between companies with similar attributes is weighted based on the measured maturity of the company which is derived from the company answers to the questionnaire.

Figure 2:
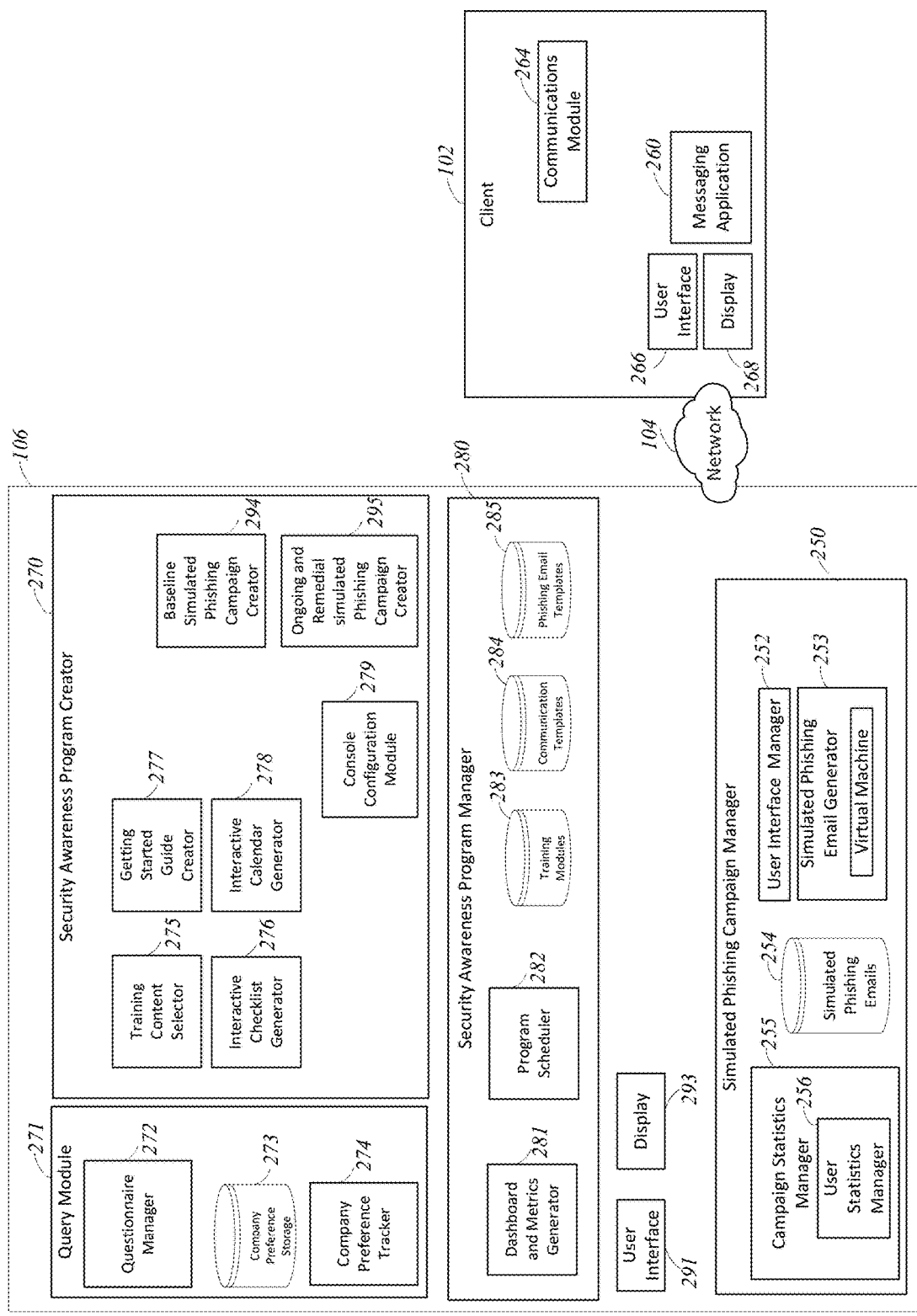
FIG. 2 depicts some of the architecture of an implementation of a system that includes a server, a client device, and a network configured to provide user interfaces based on actions associated with entrusted emails.

Referring to FIG. 2 in a general overview, FIG. 2 depicts some of the architecture of an implementation of a system 200 capable of creating an efficient and targeted security awareness program including specific components and the timing of the specific components, and determining and tracking preferences for training across various industries, company types, in addition to other company characteristics which can be used to customize the creation of security awareness programs, as well as to compare security awareness statistics across similar companies. System 200 is further capable of scheduling and tracking security awareness system events and the results of those events.

System 200 includes a server 106. The server 106 includes a query module 271, a security awareness program creator 270, a security awareness program manager 280, and a simulated phishing campaign manager 250. The query module 271 comprises a questionnaire manager 272 and a company preference tracker 274, in addition to a company preference storage 273. The security awareness program creator comprises a training content selector 275, an interactive checklist generator 276, a getting started guide creator 277, an interactive calendar generator 278, a console configuration module 279, a baseline simulated phishing campaign creator 294, and an ongoing and remedial simulated phishing campaign creator 295. The security awareness program manager 280 incudes a dashboard and metrics generator 281, a program scheduler 282, storage for training modules 283, storage for communication templates 284, and storage for phishing email templates 285. Server 106 includes a user interface 291 and a display 293, which may be used to provide a security awareness program to the security awareness system administrator, and to receive responses from the administrator. The server 106 includes a simulated phishing campaign manager 250, which is responsible for executing simulated phishing campaigns. The simulated phishing campaign manager 250 includes a campaign statistics manager 255 and a user statistics manager 256, which are responsible for keeping track of user interactions with simulated phishing emails. The simulated phishing campaign manager 250 also includes a user interface manager 252 and a simulated phishing email generator 253, which may contain a virtual machine.

Each of the server 106, the query module 271, the security awareness program creator 270, the security awareness program manager 280, the simulated phishing campaign manager 250, the questionnaire manager 272, the company preference tracker 274, the training content selector 275, the interactive checklist generator 276, the getting started guide creator 277, the interactive calendar generator 278, the console configuration module 279, the baseline simulated phishing campaign creator 294, the ongoing and remedial simulated phishing campaign creator 295, the dashboard and metrics generator 281, the program scheduler 282, the campaign statistics manager 255, the user statistics manager 256, the user interface manager 252, and the simulated phishing email generator 253, may comprise a program, service, task, script, library, application or any type and form of executable instructions or code executable on one or more processors. Any of the server 106, query module 271, security awareness program creator 270, security awareness program manager 280, simulated phishing campaign manager 250, questionnaire manager 272, company preference tracker 274, training content selector 275, interactive checklist generator 276, getting started guide creator 277, interactive calendar generator 278, console configuration module 279, baseline simulated phishing campaign creator 294, ongoing and remedial simulated phishing campaign creator 295, dashboard and metrics generator 281, program scheduler 282, campaign statistics manager 255, user statistics manager 256, user interface manager 252, and the simulated phishing email generator 253 may be combined into one or more modules, applications, programs, services, tasks, scripts, libraries, applications, or executable code. The storage modules including the communication templates storage 284, the phishing email templates storage 285, the training modules storage 283, and the company preference storage 273 may be separate storage modules or may be combined into one or more storage modules.

System 200 includes client 102. Each client includes a communications module 264, a messaging application 260, a user interface 266, and a display 268. Each of the client 102, communications module 264, a messaging application 260, user interface 266, and display 268 may comprise a program, service, task, script, library, application or any type and form of executable instructions or code executable on one or more processors. Any of the client 102, communications module 264, a messaging application 260, user interface 266, and display 268 may be combined into one or more modules, applications, programs, services, tasks, scripts, libraries, applications, or executable code.

The simulated phishing campaign manager 250 includes a simulated phishing email generator 253, which may be implemented as, or contain, a virtual machine. The simulated phishing campaign manager 250 also includes a user interface manager 252. Responsive to a user input, the simulated phishing campaign manager 250 generates a campaign for a simulated phishing attack, including one or more selected phishing email templates, one or more selected landing page templates, and one or more selected targeted user groups, in addition to other user input. The simulated phishing campaign manager includes campaign statistics manager 255 and user statistics manager 256, which track and maintain statistics of interactions with the simulated phishing mails by a plurality of users of the one or more selected targeted user groups. The campaign statistics manager 255 tracks and maintains statistics related to a specific campaign, and the user statistics manager 256 tracks and maintains statistics related to a specific user.

In an implementation, system 200 includes a server 106. The server 106 may be a part of a cluster of servers 106. In some embodiments, tasks performed by the server 106 may be performed by a plurality of servers. These tasks may be allocated among the cluster of servers by an application, service, daemon, routine, or other executable logic for task allocation. The server 106 may include a processor and memory.

The simulated phishing campaign manager 250 may manage various aspects of a simulated phishing attack campaign. For example, the simulated phishing campaign manager 250 may process input from the server 106 and/or may provide access as needed to various applications, modules, and other software components of the server 106 to other various applications, modules, and other software components of the server 106. The simulated phishing campaign manager 250 may monitor and control timing of various aspects of a simulated attack campaign, may process requests for access to simulated attack campaign results and statistics, and/or may perform other tasks related to the management of a simulated attack campaign.

In some embodiments, the simulated phishing campaign module 250 may be integrated with or coupled to main memory 122. In some embodiments, the main memory 122 may include any type and form of storage, such as a database or file system. The main memory 122 may store data such as parameters and scripts associated with a particular simulated phishing campaign. In an example, the main memory 122 may store a set of parameters and scripts corresponding to the choices made by a server 106 through a simulated phishing campaign manager 250, e.g. as described above for a particular simulated phishing attack.

In an implementation, the simulated phishing campaign manager 250 includes a simulated phishing email generator 253. The simulated phishing email generator 253 may be integrated with or coupled to the main memory 122 to provide the simulated phishing email generator 253 access to parameters associated with messaging choices made for a particular simulated campaign by e.g. the server 106. The simulated phishing email generator 253 may be integrated with or coupled to memory or a memory store or otherwise a storage, such as a database, containing simulated phishing emails 254. The simulated phishing email generator 253 may be integrated with or coupled to a program scheduler 282 and a dashboard and metrics generator 281. The simulated phishing campaign manager may be integrated with or coupled to an ongoing and remedial simulated phishing campaign creator 295, a baseline simulated phishing campaign creator 294, a program scheduler 282, and a console configuration module 279. The simulated phishing email generator 253 may be an application, service, daemon, routine, or other executable logic for generating messages. The messages generated by the simulated phishing email generator 253 may be of any appropriate format. For example, they may be email messages, text messages, messages used by particular messaging applications such as, e.g., WhatsApp™, or any other type of message. The message type to be used in a particular attack may be selected by e.g. a server 106 using one or more of a simulated phishing campaign manager 250 and a console configuration module 279. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine or may simply be run on an operating system of the server 106, or may be run in any other appropriate environment. The messages may be generated to be formatted consistent with specific messaging platforms, for example Outlook 365, Outlook Web Access (ONVA), Webmail, iOS, Gmail client, and so on. In some embodiments, the simulated phishing email generator 253 can be configured to generate messages having the ability to traverse users who interact with the messages to a specific landing page.

In some embodiments, the simulated phishing email generator 253 can be configured to generate a simulated phishing email. The email can appear to be delivered from a trusted email address, such as the email address of an executive of the company at which the target is employed. In addition, the email can have a "Subject:" field that is intended to cause the user to take an action, such as initiating a wire transfer. In some embodiments, the simulated phishing email generator 253 can generate one or more simulated phishing emails which are stored in the simulated phishing emails storage 254. In some embodiments, the simulated phishing email generator 253 can generate multiple instances of the email which may be delivered to the clients 102 via a network 104. For example, the server 106 can select any number of employees who should be targeted by a simulated attack. The simulated phishing email generator 253 can generate a set of emails similar to the email, each addressed to a respective target identified in the information stored in the memory 122. That is, the simulated phishing email generator 253 can generate the mails such that the "From:" and "Subject:" fields of each email are identical, while the "To:" field is adjusted according to the desired targets.

The security awareness program creator 270 manages the creation of a security awareness program. In one embodiment, the security awareness program manager 280 manages a security awareness program created by the security awareness program creator 270. The query module 271 collects and tracks information from the company and provides information from the company to the security awareness program creator 270. The query module may include a questionnaire manager 272. The questionnaire manager 272 creates a questionnaire to provide to the company to learn about the company and the industry in which the company operates. The questionnaire manager 272 may create one or more questionnaires for different companies. In some embodiments, a questionnaire that is largely or entirely the same is used for all companies. The query module 271 receives responses to the questionnaire from a company. The query module stores the company responses in the company preference storage 273. In some embodiments, all of the information in the company responses is stored in the company preference storage 273. In some embodiments, only some of the company responses are stored in the company preference storage 273. In some embodiments, the company responses are redacted to remove and information that would positively identify the company before the company responses are stored in the customer preference storage 273. The query module 271 includes a company preference tracker 274. The company preference tracker 274 collects and performs statistics on the company information provided to determine trends in the data that can be attributed to company characteristics. In some embodiments, the company preference tracker 274 uses artificial intelligence to look for trends across the company responses. In some embodiments, trends across companies are stored in the company preference storage 273. In some embodiments, trends across companies are utilized by the questionnaire manager 272 to create questionnaires that are more appropriate for the company. In some embodiments, the query module 271 provides one or more questionnaires to a company before the company has executed any aspects of a security awareness program. In some embodiments, the query module 271 provides one or more questionnaires in response to the results of a baseline simulated phishing campaign.

In an implementation, server 106 includes a security awareness program creator 270. The security awareness program creator 270 uses information from the query module 271 to create a security awareness program for a company. The security awareness program creator 270 may include a training content selector 275. The training content selector uses the information from the query module to select one or more training modules from a training modules storage 283 to be included in a security awareness program for a company. In one embodiment, the training content selector creates a subset of training modules that the company may choose from for the security awareness program. Security awareness program creator 270 may include an interactive checklist generator 276. The interactive checklist generator 276 is operative to generate a checklist that includes a number of steps of a security awareness program. In some embodiments, a checklist may include a number of steps that a company needs to undertake in order to configure a customized security awareness program. In some embodiments, a checklist may include a number of steps that a company needs to take in order to execute a security awareness program. The security awareness program creator 270 may include a getting started guide creator 277. In some embodiments, the getting started guide creator 277 creates a guide which explains to a company all the steps that need to be taken in order to create a customized security awareness program. In some embodiments, the getting started guide creator 277 creates a guide which explains to a company all the steps that need to be taken to execute a customized security awareness program. In some embodiments, the getting started guide creator 277 integrates the interactive checklist from the interactive checklist generator 276 in the getting starting guide. In some embodiments, the getting started guide is a printable copy of a customized security awareness program that the security awareness program creator 270 automatically configures. In some embodiments, the getting started guide is a printable copy of a customized security awareness program that the security awareness program manager 280 automatically manages. In some embodiments, the checklist generated by the interactive checklist generator 276 changes based on the results of one or more of a baseline simulated phishing campaign or an ongoing or remedial simulated phishing campaign. The security awareness program creator 270 may include an interactive calendar generator 278. In some embodiments, the interactive calendar generator 278 creates a calendar for the company which shows the recommended components of a customized security awareness program together with the components of a customized security awareness program that are created and executed by the company. In some embodiments, the security awareness program creator 270 includes a console configuration module 279. In some embodiments, the console configuration module 279 configures the company console such that it is ready to execute a customized security awareness program. In some embodiments, the console configuration module 279 creates and executes a baseline simulated phishing test for the company. In some embodiments, the console configuration module 279 enrolls employees in security awareness training for the company. In some embodiments, the console configuration module 279 installs a user interface that allows employees of the company to alert a system administrator of the company when they believe that have received a phishing attack. In some embodiments, the console configuration module 279 whitelists IP addresses and domains that are known and considered safe to the company. In some embodiments, the console configuration module 279 incorporates the company's logo and default business days and hours into simulated phishing attacks. In some embodiments, the console configuration module 279 imports users of a company into the system. In some embodiments, the console configuration module 279 imports users of a company into the system using active directory integration. In some embodiments, the security awareness program creator 270 includes a baseline simulated phishing campaign creator 294. The baselines simulated phishing campaign creator 294 will create a baseline simulated phishing campaign that will test the company employees to determine the phish-prone percentage for the company before a security awareness program is started. In some embodiments, the security awareness program creator 270 includes an ongoing and remedial simulated phishing campaign creator 295. In some embodiments, the ongoing and remedial simulated phishing campaign creator 295 creates one or more simulated phishing campaigns that will be run during the duration of the security awareness program to reinforce training that users have taken and to provide a current measure of the company's phish-prone percentage.

In an implementation, server 106 includes a security awareness program manager 280. In some embodiments, the security awareness program manager 280 includes a dashboard and metrics generator 281. In some embodiments, the dashboard and metrics generator 281 tracks and reports on the progress of the company with the security awareness program. In some embodiments, the dashboard and metrics generator tracks the improvement of the company's phish-prone percentage at various stages of the security awareness program. In some embodiments, the security awareness program manager 280 includes a program scheduler 282. In some embodiments, the program scheduler 282 communicates with the simulated phishing campaign manager 250 to schedule simulated phishing campaigns according to a calendar generated by the interactive calendar generator 278. In some embodiments, the security awareness program manager 280 includes storages of training modules that are part of the customized security awareness program created for a company. In some embodiments, the security awareness program manager 280 includes storages of communication templates that are part of the customized security awareness program created for a company. In some embodiments, the security awareness program manager 280 includes storages of phishing email templates that may be used for simulated phishing attacks as part of the customized security awareness program created for a company.

The server 106 includes a user interface 291 and a display 293. The user interface 291 enables a security awareness program system administrator to interact with the simulated phishing campaign manager 250, the security awareness program manager 280, the security awareness program creator 270, and the query module 271.

The system 200 also includes client 102. A client 102 may be a target of any simulated phishing attack or actual phishing attack. For example, the client may be an employee, member, or independent contractor working for a company that is performing a security checkup or conducts ongoing simulated phishing attacks to maintain security. The client 102 may be any device used by the client. The client need not own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of a company. The client may access a server that is e.g, owned or managed or otherwise associated with the company. Such a server may be a client 102.

In some embodiments, the client 102 may further include a user interface 266 such as a keyboard, a mouse, a touch screen, or any other appropriate user interface. This may be a user interface that is e.g. connected directly to a client 102, such as, for example, a keyboard connected to a mobile device, or may be connected indirectly to a client 102, such as, for example, a user interface of a client device 102 used to access a server client 102. The client 102 may include a display 268, such as a screen, a monitor connected to the device in any manner, or any other appropriate display.

In an implementation, the client 102 may include a messaging application 260. The messaging application 260 may be any application capable of viewing, editing, and/or sending messages. For example, the messaging application 260 may be an instance of an application that allows viewing of a desired message type, such as any web browser, a Gmail™ application, Microsoft Outlook™, WhatsApp™, a text messaging application, or any other appropriate application. In some embodiments, the messaging application 260 can be configured to display simulated phishing attack entails. Furthermore, the messaging application 260 can be configured to allow the target to generate reply messages or forwarded messages in response to the messages displayed by the messaging application 260.

In some embodiments, the client 102 may include a communications module 264. This may be a library, application programming interface (API), set of scripts, or any other code that may facilitate communications between the client 102 and any of the server 106, a third-party server, or any other server. In some embodiments, the communications module 264 determines when to transmit information from the client 102 to external servers 106 via a network 104. In some embodiments, the information transmitted by the communications module 264 may correspond to a message, such as an email, generated by the messaging application 260.

In some embodiments, reply emails sent from the client 102 to the server 106 can be processed by the simulated phisiting campaign manager 250. For example, simulated phishing campaign manager 250 can be configured to process reply emails received from one or more target clients 102 to determine the identities of the targets who sent the reply emails. In some embodiments, the identities of the targets may be determined based in part on the unique identifiers included within each reply email received by the server 106.

The system 200 may include a network 104. The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network. The network 104 connects the server 106 and a client 102. The client 102 comprises a communications module 264, a user interface 266, a display 268, a messaging application 280, and a memory such as any embodiments of main memory 122 described herein or any type and form of storage, such as a database or file system. The client 102 receives the email sent by the server 106 based upon the campaign created and executed by the simulated phishing campaign manager 250. The client 102 is able to receive the simulated phishing email via the messaging application 280, display the received email for the user using the display 268, and is able to accept user interaction via the user interface 266 responsive to the displayed email. If the user interacts with the simulated phishing email, the client 102 traverses to a landing page or display used by the simulated phishing campaign manager 250 in the phishing campaign and the details of the user interaction with the simulated phishing email are tracked by the account tracker 230, the campaign event tracker 232 and the IP address tracker 234, and are included in the campaign statistics by the campaign statistics manager 255, and are included in the user's statistics by the user statistics manager 256.

Figure 3A:
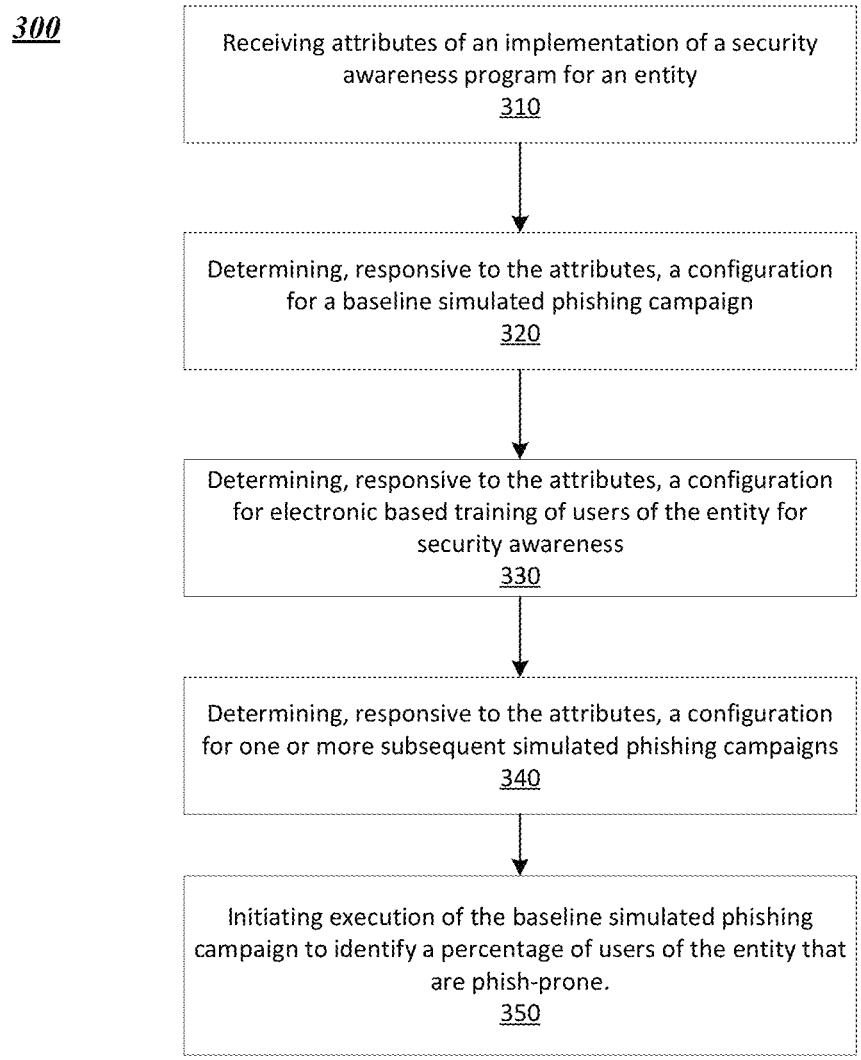
FIG. 3A depicts an implementation of a method for implementing a security awareness program for an entity.

Referring to FIG. 3A in a general overview, FIG. 3A depicts a method for determining a configuration for a security awareness program responsible to receiving attributes from an entity. In some embodiments, an entity is a company or an organization. In step 310, the server receives attributes of an implementation of a security awareness program for an entity. In step 320, the server determines, responsive to the attributes, a configuration for a baseline simulated phishing campaign. In step 330, the server determines, responsive to the attributes, a configuration for electronic based training of users of the entity for security awareness. In step 340, the server determines, responsive to the attributes, a configuration for one or more subsequent simulated phishing campaigns. In step 350, the server initiates execution of the baseline simulated phishing campaign to identify a percentage of users of the entity that are phish-prone.

In step 310, the server receives attributes of an implementation of a security awareness program for an entity. In one embodiment, an attribute of an implementation of a security awareness program for an entity includes industry compliance requirements that apply for the entity. In one embodiment, an attribute of an implementation of a security awareness program for an entity includes the primary focus of the security awareness program for the entity. In one embodiment, a primary focus of the security awareness program for the entity is security awareness delivery. In one embodiment, a primary focus of the security awareness program for the entity is compliance. In some embodiments, a primary focus of the security awareness program for the entity is behavior modification. In some embodiments, where the primary focus of the security awareness program is behavior modification, the query module 271 will adapt the questionnaire to determine the behavior changes the entity wishes to focus on. In some embodiments, there are 10 attributes representing types of behavior changes. In some embodiments, three attributes representing behavior changes are received by the server. In some embodiments, the server may receive an open text field with desired behavior changes from the entity. In some embodiments, examples of different attributes representing behavior changes include clicking links, better passwords, opening attachments, reporting incidents, clean desks, safe web-browsing, tailgating, safe social media practices, physical device security, and mobile device security. In one embodiment, an attribute of an implementation of a security awareness program for an entity includes the business sector and vertical of the entity. In some embodiments, the business sector and vertical of the entity are selectable from the defaults in a CRM tool such as Salesforce. In some embodiments, the sectors may include one or more of utilities, financial services, banking, technology, manufacturing, government, healthcare and pharmaceuticals, insurance, not for profit, business services, consulting, education, energy and utilities, and retail and wholesale. In some embodiments, the dashboard and metrics generator 281 will use information about the sector of the entity to collect metrics and correlate metrics in industry or sector specific ways. In one embodiment, an attribute of an implementation of a security awareness program for an entity includes an entity's tolerance and preference for mandatory interactive training frequency. In some embodiments, the frequency may include one or more of monthly, quarterly, biannually, and yearly. In one embodiment, an attribute of an implementation of a security awareness program for an entity includes identification of the delivery channels that the entity wants to include in the security awareness program. In some embodiments, the delivery channels may include one or more of interactive training modules, short video for use on the entity intranet, break rooms, digital signage, downloadable posters, newsletters, and interactive games. In one embodiment, an attribute of an implementation of a security awareness program for an entity includes identification of the style of training that the entity wants to include in the security awareness program. In some embodiments, the style may include one or more of serious, humorous, infographic style, or public service announcement style. In one embodiment, an attribute of an implementation of a security awareness program for an entity includes identification of the type of content that fits the culture of the entity best. In some embodiments, the content type may include one or more of animated content, live active content, or photo-realistic content. In some embodiments, the attributes selected by the entity are used by the company preference tracker 274 to help the system determine preferences and needs that are prevalent in certain industries and segments so that more training can be created if it is found to be in demand. In one embodiment, an attribute of an implementation of a security awareness program for an entity includes identification of whether the entity wants to include role-based training in the security awareness program. In some embodiments, the entity can select the roles that they desire targeted training for. In some embodiments, the roles include one or more of executives, call center/help desk staff, IT staff, developers, and general employees. In one embodiment, an attribute of an implementation of a security awareness program for an entity includes a current level of maturity for the entity and a level of maturity that the entity would like to attain over a given period of time. In some embodiments, the time period is one month, two months, 3 months, 6 months, 1 year, or 18 months. In some embodiments, the server may use the current maturity level of the entity to compare the results of training campaigns and simulated phishing campaigns of the entity with other entities of the same maturity level. In some embodiments, the maturity goals for the entity may be used by the security awareness program creator 270 to determine the intensity of the security awareness program for the entity. In one embodiment, an attribute of an implementation of a security awareness program for an entity includes identification of the primary, secondary, and additional languages and cultures that need to be supported in the security awareness program. In one embodiment, an attribute of an implementation of a security awareness program for an entity includes how often the entity would like to train their users with simulated phishing emails for the security awareness program. In some embodiments, the frequency may be one of weekly, biweekly, monthly, quarterly, and annually. In some embodiments, this attribute may be used by the company preference tracker 274 to learn industry preferences. In one embodiment, an attribute of an implementation of a security awareness program for an entity includes identification of the categories of phishing test emails that the entity wants to include in the security awareness program. In some embodiments, this attribute may be one or more of business, IT, and social media. In some embodiments, this attribute may be used by the company preference tracker 274 to learn industry preferences. In one embodiment, an attribute of an implementation of a security awareness program for an entity includes identification attack vectors different from phishing that the entity wants to include in the security awareness program. In some embodiments, this attribute includes one or more of a USB drive security test, a social engineering exploit, vishing, or artificial intelligence driven agent testing.

In step 320, the server determines to the attributes, a configuration for a baseline simulated phishing campaign. In some embodiments, responsive to receiving compliance attributes, the server will include compliance simulated phishing testing in the baseline simulated phishing campaign for the security awareness program. In some embodiments, the maturity goals for the entity may be used by the security awareness program creator 270 to design a baseline simulated phishing campaign to determine the current maturity level of the entity. In one embodiment, identification of attack vectors different from phishing that the entity wants to include in the security awareness program may be used by the security awareness program creator 270 to design a baseline simulated testing campaign for the alternative vectors.

In step 330, the server determines, responsive to the attributes, a configuration for electronic based training of users of the entity for security awareness. In one embodiment, an entity's tolerance and preference for mandatory interactive training frequency may be used by the training content selector 275 and the interactor calendar generator 279 to determine how often to train users of the entity. In some embodiments, the training content selector 275 uses identification of whether the entity wants to include role-based training to create multiple training campaigns that are specifically designed to target these classes of users. In some embodiments, the interactive calendar generator 278 may use an entity's tolerance and preference for mandatory interactive training frequency to determine the scheduling of training campaigns. In some embodiments, responsive to receiving compliance attributes, the server will include selections for compliance training modules in the security awareness program. In some embodiments, the attributes selected by the entity will inform the training content selector 275 to determine how to deliver the selected training.

In step 340, the server determines, responsive to the attributes, a configuration for one or more subsequent simulated phishing campaigns. In some embodiments, the identification of the categories of phishing test emails that the entity wants to include in the security awareness program may be used by the ongoing and remedial simulated phishing campaign creator 295 to determine which category of simulated phishing email templates 285 to choose from for the security awareness program. In one embodiment, the attribute of how often the entity would like to train their users with simulated phishing emails for the security awareness program may be used by the ongoing and remedial simulated phishing campaign creator 295 to determine the frequency of ongoing simulated phishing campaigns.

In step 350, the server initiates execution of the baseline simulated phishing campaign to identify a percentage of users of the entity that are phish-prone. In some embodiments, the baseline simulated phishing campaign creator 294 indicates to the simulated phishing campaign manager 250 what configuration to use for the baseline simulated phishing campaign.

Figure 3B:
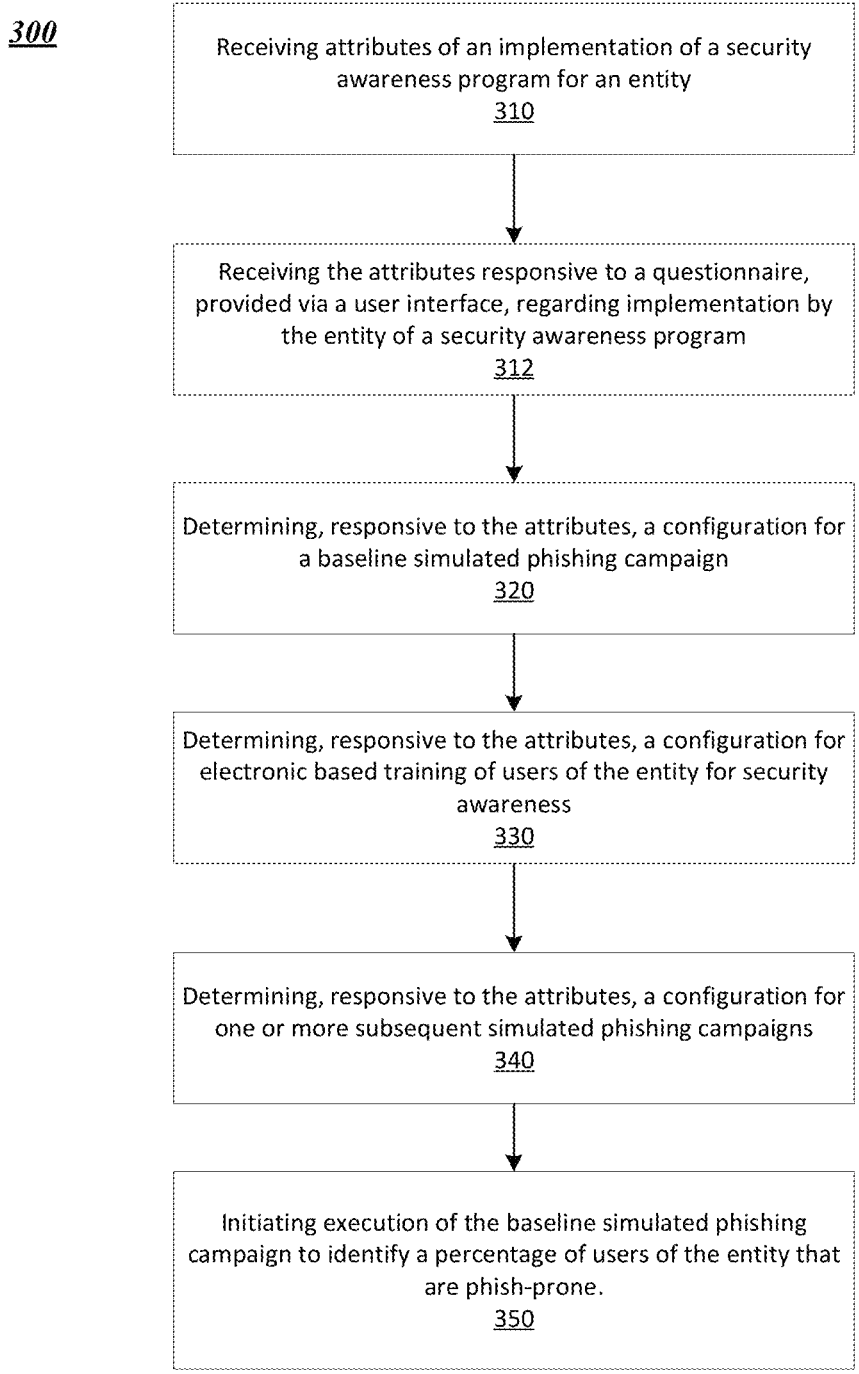
FIG. 3B depicts an implementation of a method for implementing a security awareness program which comprises receiving the attributes responsive to a questionnaire provided via a user interface.

Referring to FIG. 3B in a general overview, FIG. 3B depicts a method for determining a configuration for a security awareness program responsible to receiving attributes from an entity. In some embodiments, an entity is a company or an organization. In step 310, the server receives attributes of an implementation of a security awareness program for an entity. In step 312, the server receives the attributes responsive to a questionnaire, provided via a user interface, regarding implementation by the entity of a security awareness program. In step 320, the server determines, responsive to the attributes, a configuration for a baseline simulated phishing campaign. In step 330, the server determines, responsive to the attributes, a configuration for electronic based training of users of the entity for security awareness. In step 340, the server determines, responsive to the attributes, a configuration for one or more subsequent simulated phishing campaigns. In step 350, the server initiates execution of the baseline simulated phishing campaign to identify a percentage of users of the entity that are phish-prone.

Figure 3C:
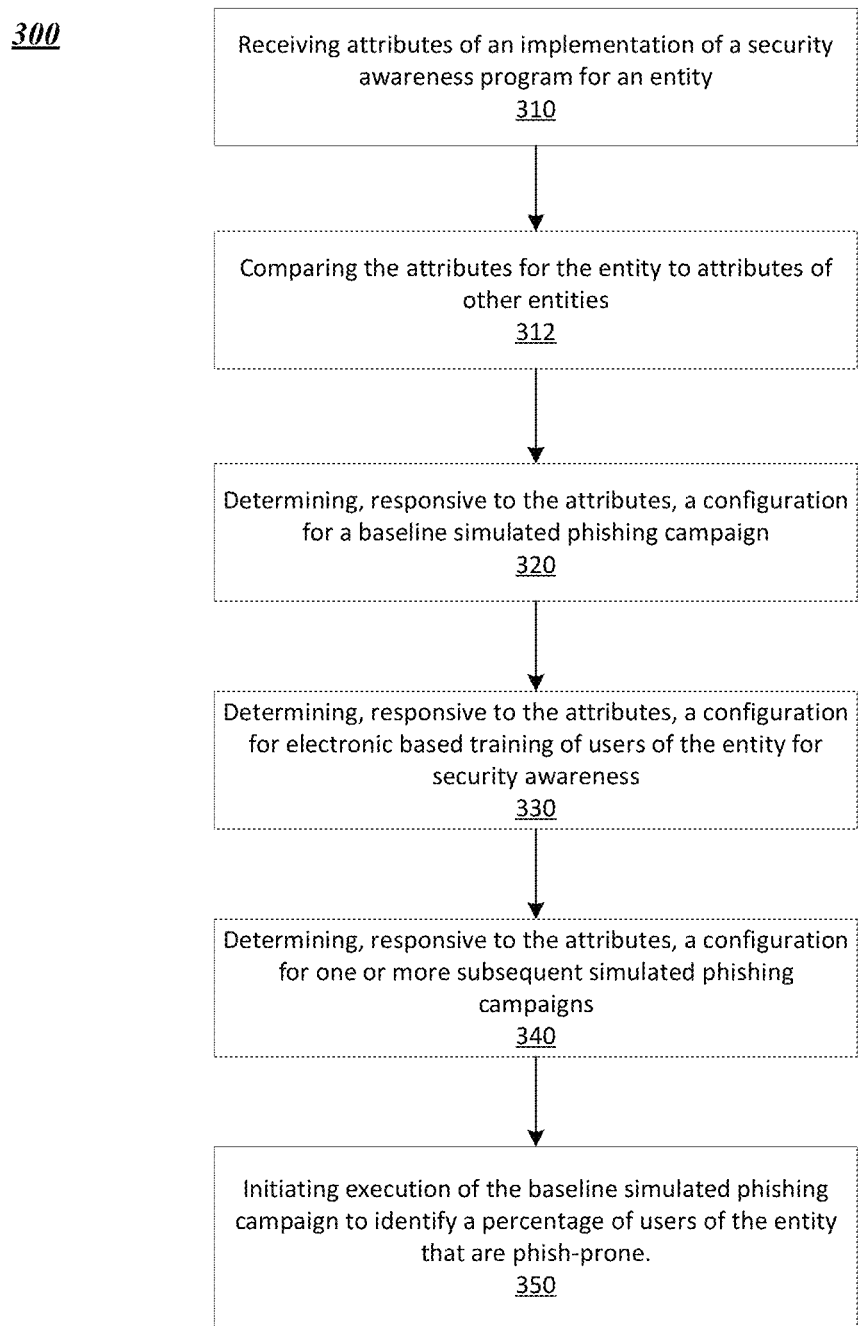
FIG. 3C depicts an implementation of a method for implementing a security awareness program which comprises comparing the attributes for the entity to attributes of other entities.

Referring to FIG. 3C in a general overview, FIG. 3C depicts a method for determining a configuration for a security awareness program responsible to receiving attributes from an entity. In some embodiments, an entity is a company or an organization. In step 310, the server receives attributes of an implementation of a security awareness program for an entity. In step 312, the server compares the attributes for the entity to attributes of other entities. In step 320, the server determines, responsive to the attributes, a configuration for a baseline simulated phishing campaign. In step 330, the server determines, responsive to the attributes, a configuration for electronic based training of users of the entity for security awareness. In step 340, the server determines, responsive to the attributes, a configuration for one or more subsequent simulated phishing campaigns. In step 350, the server initiates execution of the baseline simulated phishing campaign to identify a percentage of users of the entity that are phish-prone.

Referring to FIG. 3D in a general overview, FIG. 3D depicts a method for determining a configuration for a security awareness program responsible to receiving attributes from an entity. In some embodiments, an entity is a company or an organization. In step 310, the server receives attributes of an implementation of a security awareness program for an entity. In step 312, the server compares the attributes for the entity to attributes of other entities. In step 320, the server determines, responsive to the attributes, a configuration for a baseline simulated phishing campaign. In step 330, the server determines, responsive to the attributes, a configuration for electronic based training of users of the entity for security awareness. In step 340, the server determines, responsive to the attributes, a configuration for one or more subsequent simulated phishing campaigns. In step 342, the server determines, based on at least the comparison of the attributes for the entity to attributes of other entities, the configuration of at least one of the baseline simulated phishing campaign, the electronic based training of users of the entity for security awareness, or the one or more subsequent simulated phishing campaigns. In step 350, the server initiates execution of the baseline simulated phishing campaign to identify a percentage of users of the entity that are phish-prone.

Figure 3E:
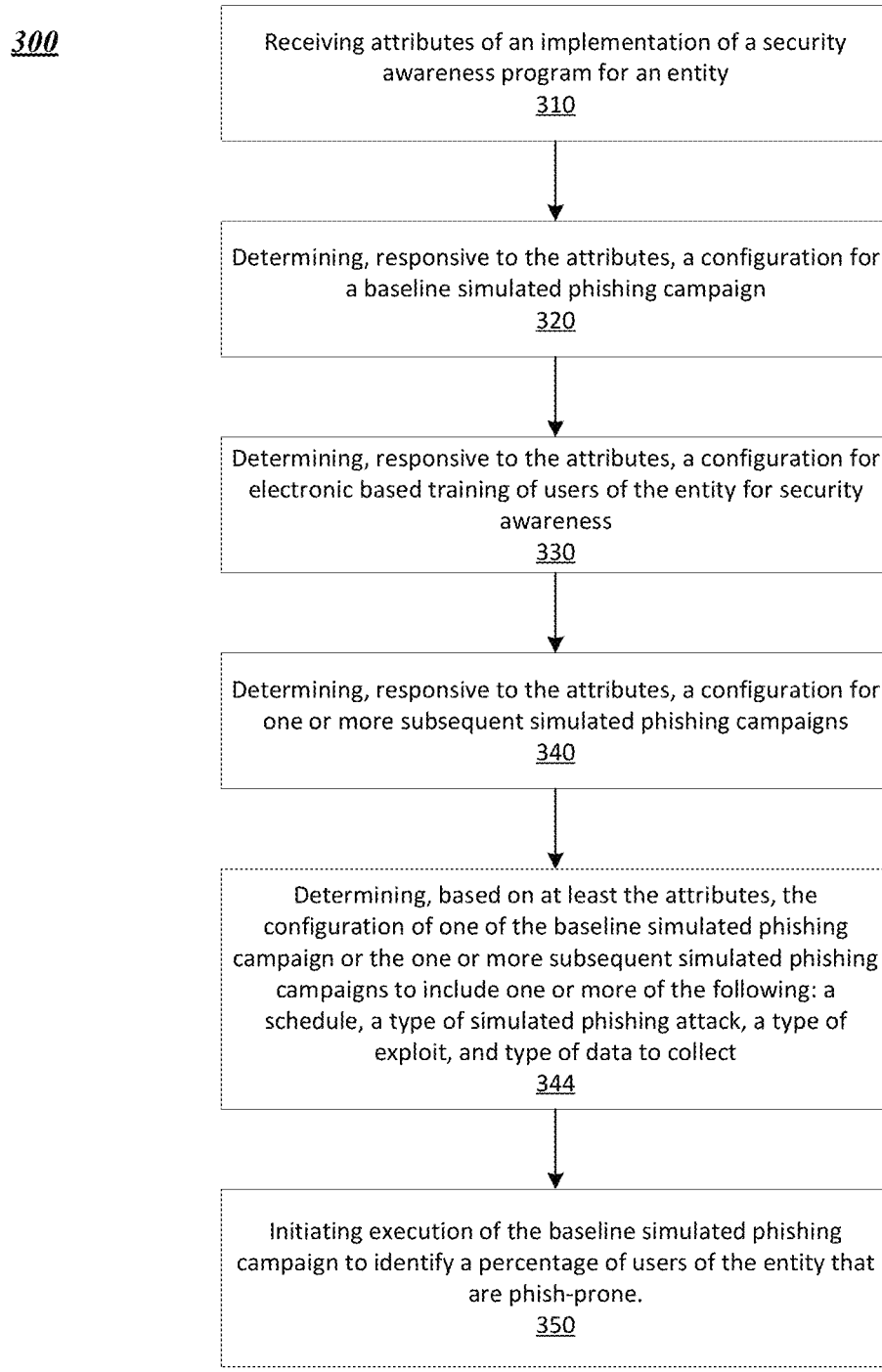
FIG. 3E depicts an implementation of a method for implementing a security awareness program which comprises determining the configuration of a simulated phishing campaign to include one or more of the following: a schedule, a type of simulated phishing attack, a type of exploit, and type of data to collect.

Referring to FIG. 3E in a general overview, FIG. 3E depicts a method for determining a configuration for a security awareness program responsible to receiving attributes from an entity. In some embodiments, an entity is a company or an organization. In step 310, the server receives attributes of an implementation of a security awareness program for an entity. In step 320, the server determines, responsive to the attributes, a configuration for a baseline simulated phishing campaign. In step 330, the server determines, responsive to the attributes, a configuration for electronic based training of users of the entity for security awareness. In step 340, the server determines, responsive to the attributes, a configuration for one or more subsequent simulated phishing campaigns. In step 344, the server determines, based on at least the attributes, the configuration of one of the baselines simulated phishing campaign or the one or more subsequent simulated phishing campaign to include one or more of the following: a schedule, a type of simulated phishing attack, a type of exploit, and a type of data to collect. In step 350, the server initiates execution of the baseline simulated phishing campaign to identify a percentage of users of the entity that are phish-prone.

Figure 3F:
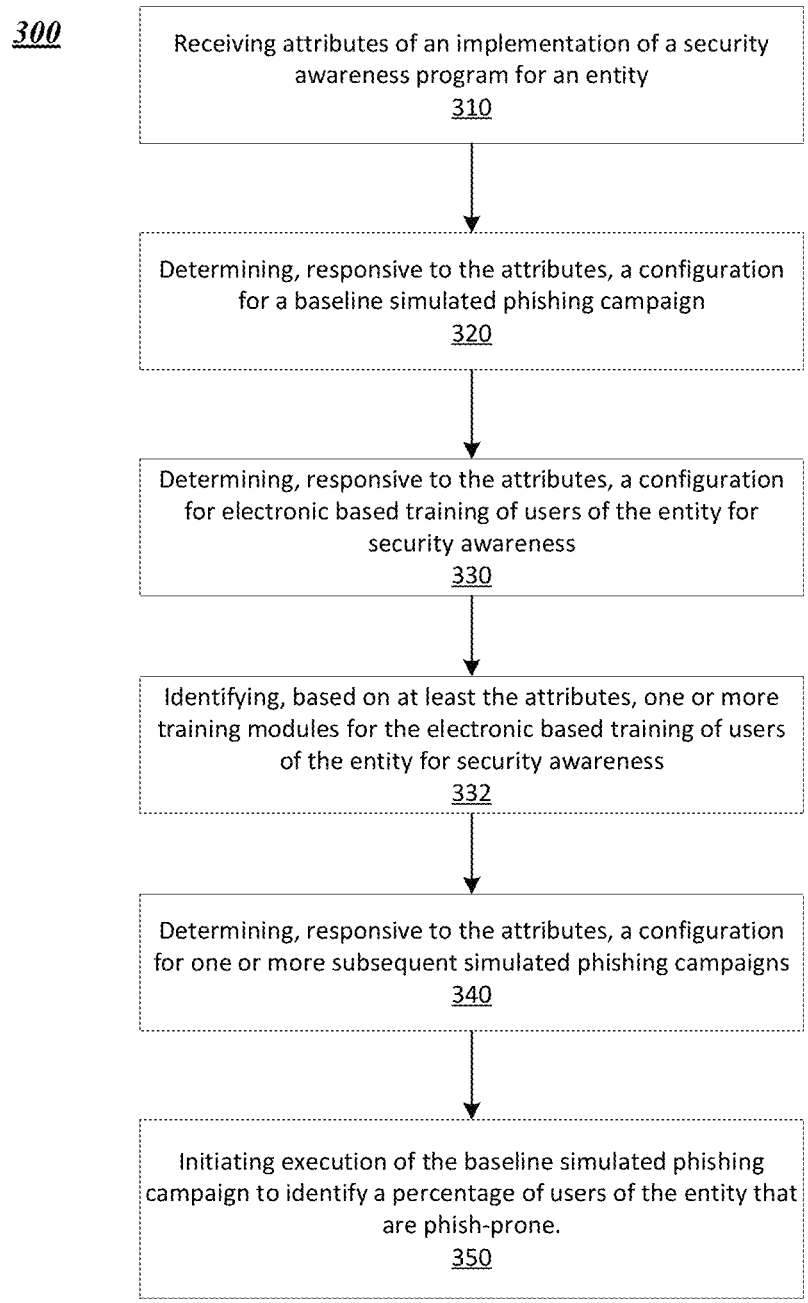
FIG. 3F depicts an implementation of a method for implementing a security awareness program which comprises identifying, based on at least the attributes, one or more training modules for the electronic based training of users of the entity for security awareness.

Referring to FIG. 3F in a general overview, FIG. 3F depicts a method for determining a configuration for a security awareness program responsible to receiving attributes from an entity. In some embodiments, an entity is a company or an organization. In step 310, the server receives attributes of an implementation of a security awareness program for an entity. In step 320, the server determines, responsive to the attributes, a configuration for a baseline simulated phishing campaign. In step 330, the server determines, responsive to the attributes, a configuration for electronic based training of users of the entity for security awareness. In step 332, the server identifies, based on at least the attributes, one or more training modules for the electronic based training of users of the entity for security awareness. In step 340, the server determines, responsive to the attributes, a configuration for one or more subsequent simulated phishing campaigns. In step 350, the server initiates execution of the baseline simulated phishing campaign to identify a percentage of users of the entity that are phish-prone.

Figure 3G:
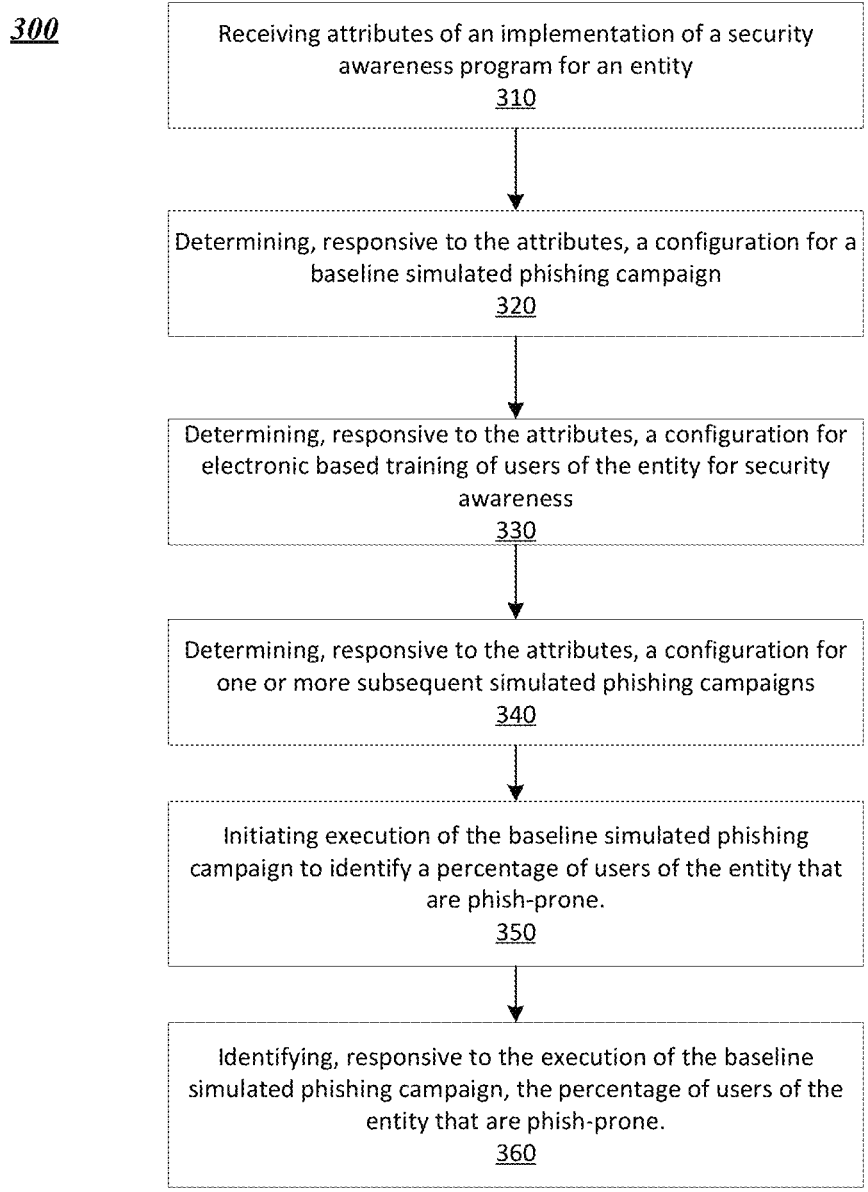
FIG. 3G depicts an implementation of a method for implementing a security awareness program which comprises identifying, responsive to the execution of the baseline simulated phishing campaign, the percentage of users of the entity that are phish-prone.

Referring to FIG. 3G in a general overview, FIG. 3G depicts a method for determining a configuration for a security awareness program responsible to receiving attributes from an entity. In some embodiments, an entity is a company or an organization. In step 310, the server receives attributes of an implementation of a security awareness program for an entity. In step 320, the server determines, responsive to the attributes, a configuration for a baseline simulated phishing campaign. In step 33, the server determines, responsive to the attributes, a configuration for electronic based training of users of the entity for security awareness. In step 340, the server determines, responsive to the attributes, a configuration for one or more subsequent simulated phishing campaigns. In step 350, the server initiates execution of the baseline simulated phishing campaign to identify a percentage of users of the entity that are phish-prone. In step 360, the server identifies, responsive to the execution of the baseline simulated phishing campaign, the percentage of users of the entity that are phish-prone. In some embodiments, the percentage of users of the entity that are phish-prone comprise a number of users of the entity that clicked on a link of a simulated phishing email.

Figure 3H:
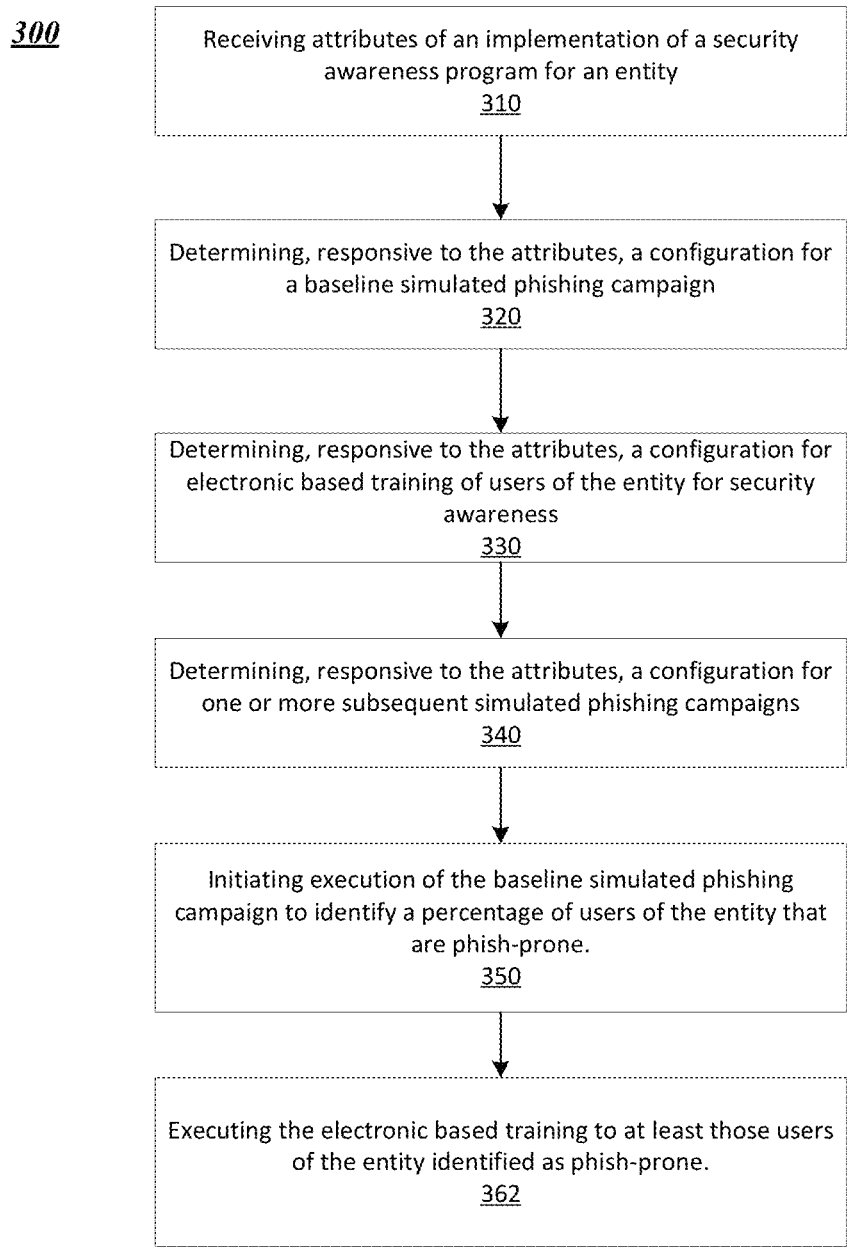
FIG. 3H depicts an implementation of a method for implementing a security awareness program which comprises executing the electronic based training to at least those users of the entity identified as phish-prone.
Figure 31:
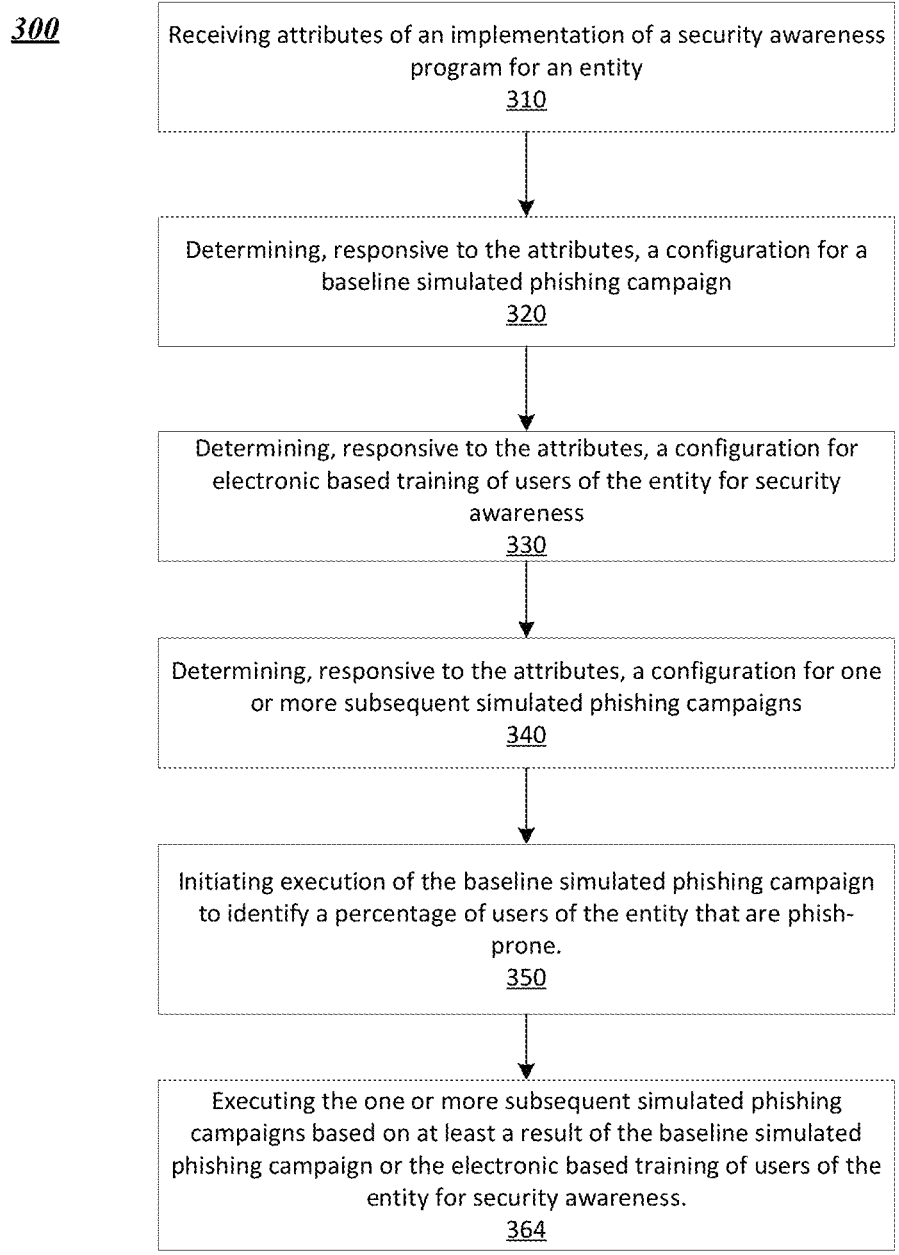

Referring to FIG. 3H in a general overview, FIG. 3H depicts a method for determining a configuration for a security awareness program responsible to receiving attributes from an entity. In some embodiments, an entity is a company or an organization. In step 310, the server receives attributes of an implementation of a security awareness program for an entity. In step 320, the server determines, responsive to the attributes, a configuration for a baseline simulated phishing campaign. In step 330, the server determines, responsive to the attributes, a configuration for electronic based training of users of the entity for security awareness. In step 340, the server determines, responsive to the attributes, a configuration for one or more subsequent simulated phishing campaigns. In step 350, the server initiates execution of the baseline simulated phishing campaign to identify a percentage of users of the entity that are phish-prone. In step 362, the server executes the electronic based training to at least those users of the entity identified as phish-prone.

Referring to FIG. 3I in a general overview, FIG. 3I depicts a method for determining a configuration for a security awareness program responsible to receiving attributes from an entity. In some embodiments, an entity is a company or an organization. In step 310, the server receives attributes of an implementation of a security awareness program for an entity. In step 320, the server determines, responsive to the attributes, a configuration for a baseline simulated phishing campaign. In step 330, the server determines, responsive to the attributes, a configuration for electronic based training of users of the entity for security awareness. In step 340, the server determines, responsive to the attributes, a configuration for one or more subsequent simulated phishing campaigns. In step 350, the server initiates execution of the baseline simulated phishing campaign to identify a percentage of users of the entity that are phish-prone. In step 364, the server executes the one or more subsequent simulated phishing campaigns based on at least a result of the baseline simulated phishing campaign or the electronic based training of users of the entity for security awareness.

Referring to FIG. 4A in a general overview, FIG. 4A depicts a method for generating a security awareness program responsible to receiving attributes from an entity, electronically representing a proposed schedule of the security awareness program in an electronic calendar of a selected account and generating in the electronical calendar one or more graphical representations of the simulated phishing campaign and the electronic training campaign. In some embodiments, an entity is a company or an organization. In step 410, the server receives attributes for implementing a security awareness program for an entity. In step 420, the server generates the security awareness program comprising a plurality of actions, wherein at least one of the plurality of actions comprises a simulated phishing campaign and wherein at least another of the plurality of actions comprises an electronic training campaign. In step 430, the server automatically schedules, to electronically represent a proposed schedule of the security awareness program, in an electronic calendar of a selected account, each of the plurality of actions as one of a meeting or a reminder based on the type of action. In step 440, the server generates, in the electronic calendar, on or more graphical representations of the simulated phishing campaign and the electronic training campaign, wherein the one or more graphical representations are selectable to display one or more metrics of a corresponding campaign.

In step 410, the server receives attributes for implementing a security awareness program for an entity. In one embodiment, an attribute for implementing a security awareness program for an entity includes industry compliance requirements that apply for the entity. In one embodiment, an attribute for implementing a security awareness program for an entity includes the primary focus of the security awareness program for the entity. In one embodiment, a primary focus of the security awareness program for the entity is security awareness delivery. In one embodiment, a primary focus of the security awareness program for the entity is compliance. In some embodiments, a primary focus of the security awareness program for the entity is behavior modification. In some embodiments, where the primary focus of the security awareness program is behavior modification, the query module 271 will adapt the questionnaire to determine the behavior changes the entity wishes to focus on. In some embodiments, there are 10 attributes representing types of behavior changes. In some embodiments, three attributes representing behavior changes are received by the server. In some embodiments, the server may receive an open text field with desired behavior changes from the entity. In some embodiments, examples of different attributes representing behavior changes include clicking links, better passwords, opening attachments, reporting incidents, clean desks, safe web-browsing, tailgating, safe social media practices, physical device security, and mobile device security. In one embodiment, an attribute for implementing a security awareness program for an entity includes the business sector and vertical of the entity. In some embodiments, the business sector and vertical of the entity are selectable from the defaults in a CRM tool such as Salesforce. In some embodiments, the sectors may include one or more of utilities, financial services, banking, technology, manufacturing, government, healthcare and pharmaceuticals, insurance, not for profit, business services, consulting, education, energy and utilities, and retail and wholesale. In some embodiments, the dashboard and metrics generator 281 will use information about the sector of the entity to collect metrics and correlate metrics in industry or sector specific ways. In one embodiment, an attribute for implementing a security awareness program for an entity includes an entity's tolerance and preference for mandatory interactive training frequency. In some embodiments, the frequency may include one or more of monthly, quarterly, biannually, and yearly. In one embodiment, an attribute for implementing a security awareness program for an entity includes identification of the delivery channels that the entity wants to include in the security awareness program. In some embodiments, the delivery channels may include one or more of interactive training modules, short video for use on the entity intranet, break rooms, digital signage, downloadable posters, newsletters, and interactive games. In one embodiment, an attribute for implementing a security awareness program for an entity includes identification of the style of training that the entity wants to include in the security awareness program. In some embodiments, the style may include one or more of serious, humorous, infographic style, or public service announcement style. In one embodiment, an attribute for implementing a security awareness program for an entity includes identification of the type of content that fits the culture of the entity best. In some embodiments, the content type may include one or more of animated content, live active content, or photo-realistic content. In some embodiments, the attributes selected by the entity are used by the company preference tracker 274 to help the system determine preferences and needs that are prevalent in certain industries and segments so that more training can be created if it is found to be in demand. In one embodiment, an attribute for implementing a security awareness program for an entity includes identification of whether the entity wants to include role-based training in the security awareness program. In some embodiments, the entity can select the roles that they desire targeted training for. In some embodiments, the roles include one or more of executives, call center/help desk staff, IT staff, developers, and general employees. In one embodiment, an attribute for implementing a security awareness program for an entity includes a current level of maturity for the entity and a level of maturity that the entity would like to attain over a given period of time. In some embodiments, the time period is one month, two months, 3 months, 6 months, 1 year, or 18 months. In some embodiments, the server may use the current maturity level of the entity to compare the results of training campaigns and simulated phishing campaigns of the entity with other entities of the same maturity level. In some embodiments, the maturity goals for the entity may be used by the security awareness program creator 270 to determine the intensity of the security awareness program for the entity. In one embodiment, an attribute for implementing a security awareness program for an entity includes identification of the primary, secondary, and additional languages and cultures that need to be supported in the security awareness program. In one embodiment, an attribute for implementing a security awareness program for an entity includes how often the entity would like to train their users with simulated phishing emails for the security awareness program. In some embodiments, the frequency may be one of weekly, biweekly, monthly, quarterly, and annually. In some embodiments, this attribute may be used by the company preference tracker 274 to learn industry preferences. In one embodiment, an attribute for implementing a security awareness program for an entity includes identification of the categories of phishing test emails that the entity wants to include in the security awareness program. In some embodiments, this attribute may be one or more of business, IT, and social media. In some embodiments, this attribute may be used by the company preference tracker 274 to learn industry preferences, in one embodiment, an attribute for implementing a security awareness program for an entity includes identification attack vectors different from phishing that the entity wants to include in the security awareness program. In some embodiments, this attribute includes one or more of a USB drive security test, a social engineering exploit, vishing, or artificial intelligence driven agent testing.

In step 420, the server generates the security awareness program comprising a plurality of actions, wherein at least one of the plurality of actions comprises a simulated phishing campaign and wherein at least another of the plurality of actions comprises an electronic training campaign. In some embodiments, the server will include compliance simulated phishing testing in the baseline simulated phishing campaign for the security awareness program. In some embodiments, the maturity goals for the entity may be used by the security awareness program creator 270 to design a baseline simulated phishing campaign to determine the current maturity level of the entity. In one embodiment, identification of attack vectors different from phishing that the entity wants to include in the security awareness program may be used by the security awareness program creator 270 to design a baseline simulated testing campaign for the alternative vectors. In one embodiment, an entity's tolerance and preference for mandatory interactive training frequency may be used by the training content selector 275 and the interactor calendar generator 279 to determine how often to train users of the entity. In some embodiments, the training content selector 275 uses identification of whether the entity wants to include role-based training to create multiple training campaigns that are specifically designed to target these classes of users.

In step 430, the server automatically schedules to electronically represent a proposed schedule of the security awareness program, in an electronic calendar of a selected account, each of the plurality of actions of the security awareness program as one of a meeting or a reminder based on a type of action. In some embodiments, the interactive calendar generator 278 may use an entity's tolerance and preference for mandatory interactive training frequency to determine the scheduling of training campaigns. In some embodiments, responsive to receiving compliance attributes, the server will include selections for compliance training modules in the security awareness program and will schedule the compliance training modules according to best practices relevant for the industry of the company. In some embodiments, the attributes selected by the entity will inform the training content selector 275 to determine how to deliver the selected training and the server will schedule the selected training in the electronic calendar.

In step 440, the server generates, in the electronic calendar, one or more graphical representation of the simulated phishing campaign and the electronic training campaign, wherein the one or more graphical representations are selectable to display one or more metrics of a corresponding campaign. In some embodiments, the graphical representation is organized into metrics for the entire campaign and metrics for each user. In some embodiments, the graphical representation aggregates statistics across all the users. In some embodiments, the graphical representation is updated in real time as the campaign progresses.

Figure 4B:
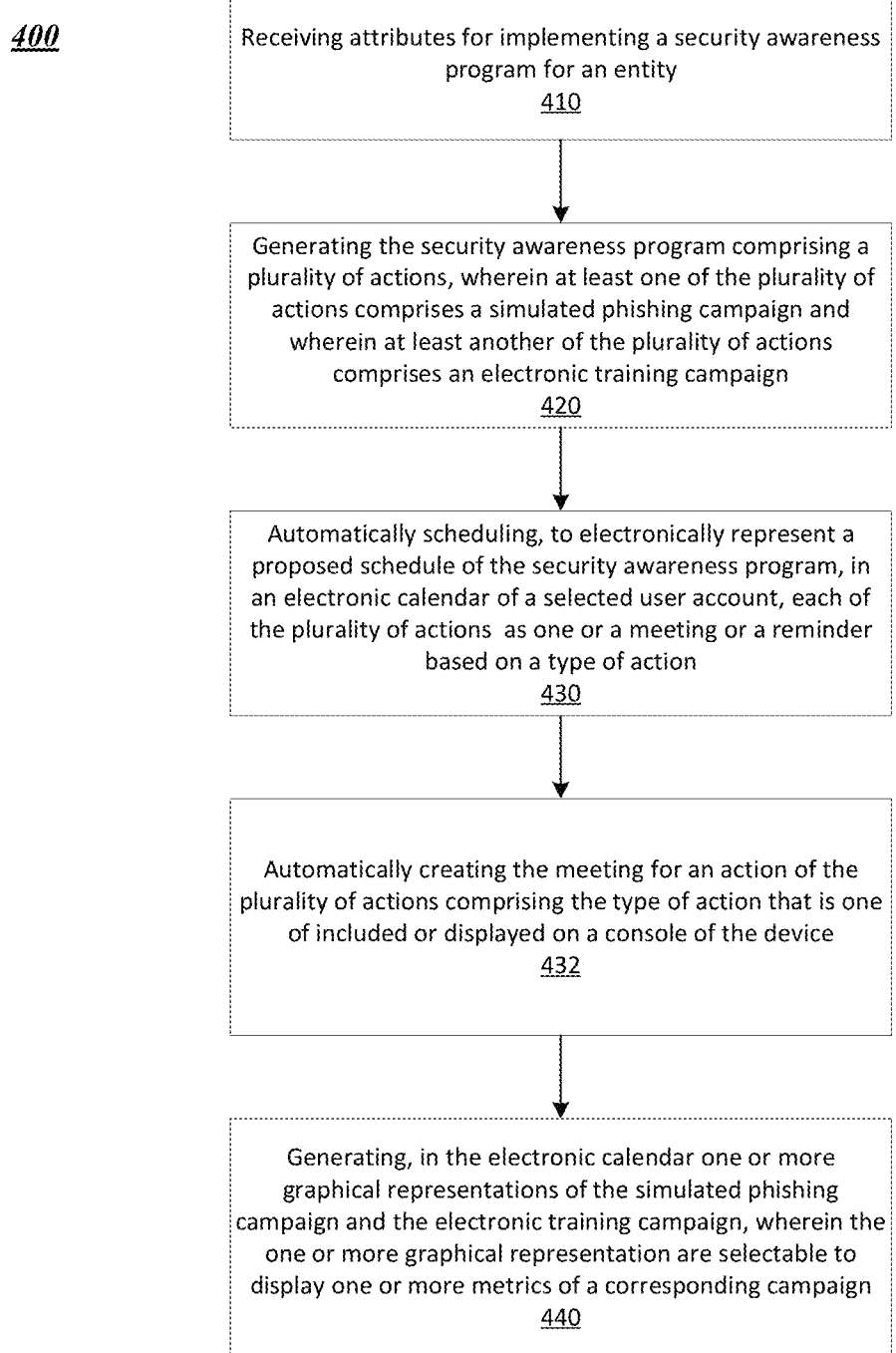
FIG. 4B depicts an implementation of a method for creating a security awareness program which comprises automatically creating the meeting for an action of the plurality of actions comprising the type of action that is one of included or displayed on a console of the device.

Referring to FIG. 4B in a general overview, FIG. 4B depicts a method for generating a security awareness program responsible to receiving attributes from an entity, electronically representing a proposed schedule of the security awareness program in an electronic calendar of a selected account and generating in the electronical calendar one or more graphical representations of the simulated phishing campaign and the electronic training campaign. In some embodiments, an entity is a company or an organization. In step 410, the server receives attributes for implementing a security awareness program for an entity. In step 420, the server generates the security awareness program comprising a plurality of actions, wherein at least one of the plurality of actions comprises a simulated phishing campaign and wherein at least another of the plurality of actions comprises an electronic training campaign. In step 430, the server automatically schedules, to electronically represent a proposed schedule of the security awareness program, in an electronic calendar of a selected account, each of the plurality of actions as one of a meeting or a reminder based on the type of action. In step 432, the server automatically creates the meeting for an action of the plurality of actions comprising the type of action that is one of included or displayed on a console of the device. In some embodiments, the server automatically creates the meeting for a simulated phishing campaign. In some embodiments, the server automatically creates the meeting for a training campaign. In some embodiments, the server automatically creates the meeting for a baseline phishing test. In step 440, the server generates, in the electronic calendar, on or more graphical representations of the simulated phishing campaign and the electronic training campaign, wherein the one or more graphical representations are selectable to display one or more metrics of a corresponding campaign.

Referring to FIG. 4C in a general overview, FIG. 4C depicts a method for generating a security awareness program responsible to receiving attributes from an entity, electronically representing a proposed schedule of the security awareness program in an electronic calendar of a selected account and generating in the electronical calendar one or more graphical representations of the simulated phishing campaign and the electronic training campaign. In some embodiments, an entity is a company or an organization. In step 410, the server receives attributes for implementing a security awareness program for an entity. In step 420, the server generates the security awareness program comprising a plurality of actions, wherein at least one of the plurality of actions comprises a simulated phishing campaign and wherein at least another of the plurality of actions comprises an electronic training campaign. In step 430, the server automatically schedules, to electronically represent a proposed schedule of the security awareness program, in an electronic calendar of a selected account, each of the plurality of actions as one of a meeting or a reminder based on the type of action. In step 434, the server automatically creates the reminder for an action of the plurality of actions comprising the type of action that is not included or displayed on a console of the device. In some embodiments, the server automatically creates the reminder for putting up posters in an office or workspace. In some embodiments, the server automatically creates the reminder for changing visible materials in the workplace. In step 440, the server generates, in the electronic calendar, on or more graphical representations of the simulated phishing campaign and the electronic training campaign, wherein the one or more graphical representations are selectable to display one or more metrics of a corresponding campaign.

Referring to FIG. 4D in a general overview, FIG. 4D) depicts a method for generating a security awareness program responsible to receiving attributes from an entity, electronically representing a proposed schedule of the security awareness program in an electronic calendar of a selected account and generating in the electronical calendar one or more graphical representations of the simulated phishing campaign and the electronic training campaign. In some embodiments, an entity is a company or an organization. In step 410, the server receives attributes for implementing a security awareness program for an entity. In step 420, the server generates the security awareness program comprising a plurality of actions, wherein at least one of the plurality of actions comprises a simulated phishing campaign and wherein at least another of the plurality of actions comprises an electronic training campaign. In step 430, the server automatically schedules, to electronically represent a proposed schedule of the security awareness program, in an electronic calendar of a selected account, each of the plurality of actions as one of a meeting or a reminder based on the type of action. In step 436, the server generates, in the electronic calendar, on or more graphical representations of the simulated phishing campaign and the electronic training campaign, wherein the one or more graphical representations are selectable to display one or more metrics of a corresponding campaign, and wherein the one or more metrics comprises one of the following: percentage compliance, percentage complete, statistics about user interactions with campaign. In some embodiments, a metric is the number of users that have interacted with a simulated phishing attack. In some embodiments, a metric is the number of users that have completed electronic training. In some embodiments, a metric is the completion level of the security awareness program. In some embodiments, instead of representing metrics by the number of users, metrics are represented as a percentage of users. In some embodiments, a metric is the number of clicks in the first 8 hours. In some embodiments, a metric is the phish-prone percentage. In some embodiments, a metric is the number of clicks. In some embodiments, a metric is the number of recipients of the corresponding campaign. In some embodiments, a metric is the number of calls made, texts sent, or emails sent. In some embodiments, a metric is the number of suspicious messages reported. In some embodiments, a metric is the number of messages delivered. In some embodiments, a metric is the number of emails opened. In some embodiments, a metric is the number of emails bounced. In some embodiments, metrics are calculated at the company level. In some embodiments, metrics are calculated at the user level.

Referring to FIG. 4E in a general overview, FIG. 4E depicts a method for generating a security awareness program responsible to receiving attributes from an entity, electronically representing a proposed schedule of the security awareness program in an electronic calendar of a selected account and generating in the electronical calendar one or more graphical representations of the simulated phishing campaign and the electronic training campaign. In some embodiments, an entity is a company or an organization. In step 410, the server receives attributes for implementing a security awareness program for an entity. In step 420, the server generates the security awareness program comprising a plurality of actions, wherein at least one of the plurality of actions comprises a simulated phishing campaign and wherein at least another of the plurality of actions comprises an electronic training campaign. In step 430, the server automatically schedules, to electronically represent a proposed schedule of the security awareness program, in an electronic calendar of a selected account, each of the plurality of actions as one of a meeting or a reminder based on the type of action. In step 440, the server generates, in the electronic calendar, on or more graphical representations of the simulated phishing campaign and the electronic training campaign, wherein the one or more graphical representations are selectable to display one or more metrics of a corresponding campaign. In step 438, the electronic calendar is configured by the device to display a file comprising details about a campaign when a graphical representation corresponding to a completed campaign is selected.

FIG. 5 is an illustration of a question about the number of users that will participate in the security awareness program, which is part of a questionnaire that is used to automatically create a custom security awareness program.

FIG. 6 is an illustration of a question about the industry sectors of the company, which is part of a questionnaire that is used to automatically create a custom security awareness program.

FIG. 7 is an illustration of a question about maturity of the current security awareness program of the company, which is part of a questionnaire that is used to automatically create a custom security awareness program.

FIG. 8 is an illustration of a question about the desired maturity of security awareness that the company wished to attain over a period of time, which is part of a questionnaire that is used to automatically create a custom security awareness program.

FIG. 9 is an illustration of a question about the desired primary focus of the security awareness program for the company, which is part of a questionnaire that is used to automatically create a custom security awareness program.

Figure 10:
FIG. 10 is an illustration of a question about the company's tolerance for mandatory interactive training frequency, which is part of a questionnaire that is used to automatically create a custom security awareness program.

FIG. 10 is an illustration of a question about the company's tolerance for mandatory interactive training frequency, which is part of a questionnaire that is used to automatically create a custom security awareness program.

FIG. 11 is an illustration of a question about the best methods for delivering security awareness training and related information to the users of the company, which is part of a questionnaire that is used to automatically create a custom security awareness program.

FIG. 12 is an illustration of a question about the styles of delivering security awareness training and related information to the users of the company, which is part of a questionnaire that is used to automatically create a custom security awareness program.

Figure 13:
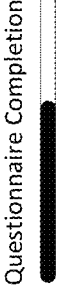
FIG. 13 is an illustration of a question about the type of content that is best aligned with the culture of the company, which is part of a questionnaire that is used to automatically create a custom security awareness program.

FIG. 13 is an illustration of a question about the type of content that is best aligned with the culture of the company, which is part of a questionnaire that is used to automatically create a custom security awareness program.

FIG. 14 is an illustration of a question about the languages that need to be accommodated for the users of the company, which is part of a questionnaire that is used to automatically create a custom security awareness program.

FIG. 15 is an illustration of a question about the roles in the company that the company needs specific training for, which is part of a questionnaire that is used to automatically create a custom security awareness program.

Figure 16:
FIG. 16 is an illustration of a question about how often the company wishes to train their users with simulated phishing emails, which is part of a questionnaire that is used to automatically create a custom security awareness program.

FIG. 16 is an illustration of a question about how often the company wishes to train their users with simulated phishing emails, which is part of a questionnaire that is used to automatically create a custom security awareness program.

FIG. 17 is an illustration of a question about which attack vectors besides phishing that the company wishes to use to train their users, which is part of a questionnaire that is used to automatically create a custom security awareness program.

FIG. 18 is an illustration of a screen which allows the selection of a start date for the security awareness program, and a selection to automatically create the security awareness program.

Figure 19:
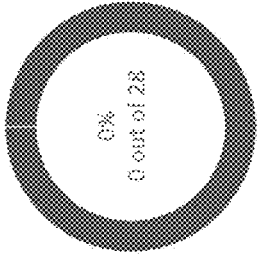
FIG. 19 is an illustration of a screen which lists the tasks which are part of the custom security awareness program that is generated by the system, shown as a selectable task list with due dates and including an indication of the level of completion of the program.

FIG. 19 is an illustration of a screen which lists the tasks which are part of the custom security awareness program that is generated by the system, shown as a selectable task list with due dates and including an indication of the level of completion of the program.

FIG. 20 is an illustration of screen in which one of the tasks which is part of the custom security awareness program that is generated by the system is expanded to show a description of the task and other resources related to the task, including a selection to edit the due date of the task and a selection to mark the task as completed.

Figure 21:
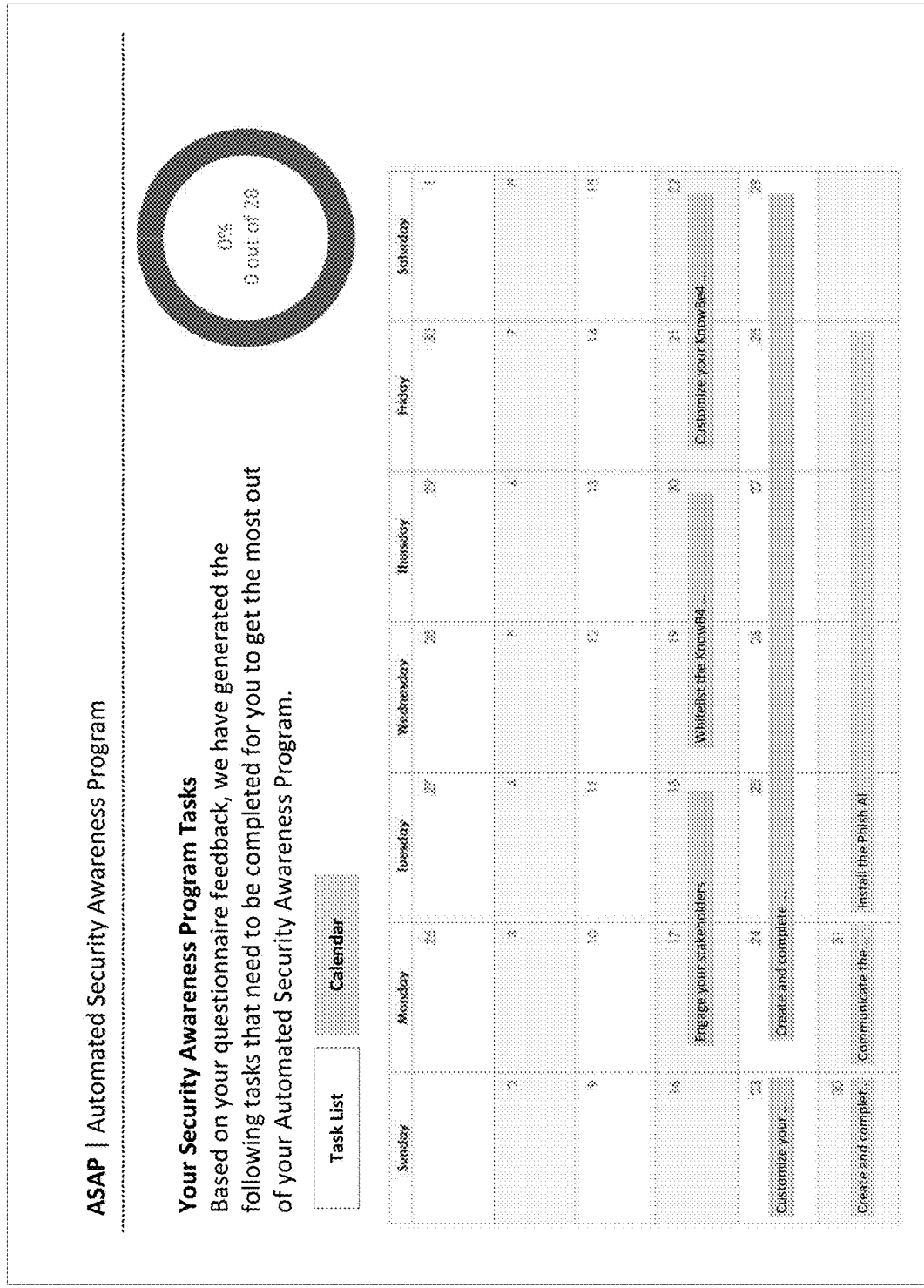
FIG. 21 is an illustration of an electronic calendar comprising an automatically generated schedule for all of the tasks which are part of the custom security awareness program that is generated by the system, including an indication of the level of completion of the program.

FIG. 21 is an illustration of an electronic calendar comprising an automatically generated schedule for all of the tasks which are part of the custom security awareness program that is generated by the system, including an indication of the level of completion of the program.

While various embodiments of the methods and systems have been described, these embodiments are exemplary and in no way do they limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A system for configuring and executing simulated phishing campaigns, the system comprising
  a device comprising one or more processors, coupled to memory and comprising:
    a query module configured to receive attributes of an implementation of a security awareness program for an entity via a questionnaire presented via a display;
    a tool executable on the one or more processors and configured to compare the attributes for the entity of an organization to attributes of other entities of other organizations, responsive to receiving the attributes, and
    determine, based at least on the comparison, a configuration for each of a baseline simulated phishing campaign to be executed to communicate electronic simulated phishing communications to users of the entity to get users to click on a link in the electronic simulated phishing communications, electronic based training for users of the entity for security awareness and one or more simulated phishing campaigns to be executed to communicate electronic simulated phishing communications to the users of the entity subsequent to the baseline simulated phishing campaign; and
  a server configured to:
    execute the baseline simulated phishing campaign to communicate electronic simulated phishing communications to devices of users, receive indications of users clicking on the link of the electronic phishing communications and identify from the received indications a percentage of users of the entity who are phish-prone, wherein the percentage of users of the entity who are phish-prone comprises a number of users of the entity that clicked on the link of the electronic simulated phishing communications;

execute the electronic based training to those users identified as phish-prone from the baseline simulated phishing campaign; and execute the one or more simulated phishing campaigns subsequent to the baseline simulated phishing campaign and based at least on results of the baseline simulated phishing campaign and the electronic based training; and wherein the server is configured to automatically determine a schedule of each of the baseline simulated phishing campaigns, the electronic based training and the one or more simulated phishing campaigns subsequent to the baseline simulated phishing campaign; and wherein the one or more simulated phishing campaigns communicate electronic simulated phishing communications to devices of users, receive indications of users clicking on the link of the electronic phishing communications and identify from the received indications the percentage of users of the entity who are phish-prone, and automatically generate in an electronic calendar according to the schedule, one or more graphical representations of each of the baseline simulated phishing campaigns, the electronic based training and the one or more simulated phishing campaigns subsequent to the baseline simulated phishing campaign, wherein the server is further configured to update, in a display of the one or more graphical representations in the electronic calendar, a status of execution of a corresponding campaign as the corresponding campaign progresses with users clicking on the link of the electronic phishing communications and, responsive to selecting the one or more graphical representations, display in a user interface a percentage of users who are phish-prone of the corresponding campaign in comparison with a percentage of phish-prone users of the other entities.

2. The system of claim 1, wherein the device comprises the user interface configured to receive the attributes responsive to the questionnaire, provided by the user interface, regarding implementation by the entity of the security awareness program.

3. The system of claim 1, wherein the tool is further configured to compare the attributes for the entity to attributes of other entities that share at least one of the attributes.

4. The system of claim 3, wherein the tool is further configured to determine, based on at least the comparison of the percentage of users of the entity who are phish-prone to one or more other entities that share at least one of the attributes, the configuration of at least one of the baseline simulated phishing campaigns, the electronic based training of users of the entity for security awareness or the one or more subsequent simulated phishing campaigns.

5. The system of claim 1, wherein the tool is further configured to determine the configuration of one of the baseline phishing simulation campaigns or the one or more simulated phishing campaigns to include one or more of the following: a schedule, a type of simulated phishing attack, a type of exploit, and a type of data to collect.

6. The system of claim 1, wherein the tool is further configured to identify, based on at least the attributes, one or more training modules for the electronic based training of users of the entity for security awareness.

7. The system of claim 1, wherein the tool is further configured to identify, responsive to execution of the baseline simulated phishing campaign, the percentage of users of the entity who are phish-prone.

8. The system of claim 7, wherein the percentage of users of the entity who are phish-prone comprise the number of users of the entity that clicked on the link of the electronic simulated phishing communications comprising a simulated phishing email.

9. The system of claim 2, wherein the server is further configured to execute the electronic based training to at least those users of the entity identified as phish-prone.

10. The system of claim 1, wherein the server is further configured to execute the one or more simulated phishing campaigns based on at least a result of one of the baseline simulated phishing campaigns or the electronic based training of users of the entity for security awareness.

11. The system of claim 1, wherein the one or more graphical representations are organized into one or more metrics for the corresponding campaign and one or more metrics for each user.

12. The system of claim 1, wherein the one or more graphical representations comprise an aggregation of statistics across users.

13. The system of claim 1, wherein the server is further configured to update the one or more graphical representations as a corresponding campaign progresses.

* * * * *